United States Patent
Clark et al.

(10) Patent No.: US 6,725,228 B1
(45) Date of Patent: Apr. 20, 2004

(54) SYSTEM FOR MANAGING AND ORGANIZING STORED ELECTRONIC MESSAGES

(76) Inventors: David Morley Clark, 920 Innes Street, Nelson, British Columbia V1L 5T2 (CA); Thomas Wilson Gibson, 230 High Street, Nelson, British Columbia V1L 3Z9 (CA); David Mitchell Bracewell, 708 Third Street, Nelson, British Columbia V1L 2R2 (CA); Jeff Toy Tsao Kwan, 12 Arundel Avenue, Toronto, Ontario M4K 3A4 (CA)

( * ) Notice: Subject to any disclaimer, the term of this patent is extended or adjusted under 35 U.S.C. 154(b) by 212 days.

(21) Appl. No.: 09/704,199

(22) Filed: Oct. 31, 2000

(51) Int. Cl.7 .................................................. G06F 7/00
(52) U.S. Cl. ......................................... 707/102; 707/7
(58) Field of Search ............................... 707/7, 200, 2, 707/102

(56) References Cited

U.S. PATENT DOCUMENTS

| | | | |
|---|---|---|---|
| 4,611,280 A | * 9/1986 | Linderman | 712/300 |
| 4,809,158 A | * 2/1989 | McCauley | 707/7 |
| 5,274,805 A | * 12/1993 | Ferguson et al. | 707/7 |
| 5,377,354 A | 12/1994 | Scannell et al. | |
| 5,440,734 A | * 8/1995 | Wagar | 707/7 |
| 5,544,360 A | 8/1996 | Lewak et al. | |
| 5,548,789 A | 8/1996 | Nakanura | |
| 5,615,367 A | * 3/1997 | Bennett et al. | 707/102 |
| 5,694,616 A | * 12/1997 | Johnson et al. | 709/207 |
| 5,813,009 A | * 9/1998 | Johnson et al. | 707/100 |
| 5,899,995 A | 5/1999 | Millier et al. | |
| 5,948,058 A | * 9/1999 | Kudoh et al. | 707/104.1 |
| 6,009,442 A | 12/1999 | Chen et al. | |
| 6,029,164 A | 2/2000 | Birrell et al. | |
| 6,057,841 A | 5/2000 | Thurlow et al. | |
| 6,073,131 A | * 6/2000 | Roberti | 707/7 |
| 6,073,142 A | * 6/2000 | Geiger et al. | 707/500 |
| 6,088,696 A | 7/2000 | Moon et al. | 707/10 |
| 6,154,740 A | * 11/2000 | Shah | 707/7 |
| 6,167,402 A | * 12/2000 | Yeager | 707/10 |
| 6,182,071 B1 | * 1/2001 | Fushimi | 707/7 |
| 6,226,630 B1 | * 5/2001 | Billmers | 707/3 |
| 6,324,569 B1 | * 11/2001 | Ogilvie et al. | 707/500 |
| 6,396,513 B1 | * 5/2002 | Helfman et al. | 709/206 |
| 6,424,995 B1 | * 7/2002 | Shuman | 709/206 |
| 6,449,615 B1 | * 9/2002 | Liu et al. | 707/10 |
| 6,466,941 B1 | * 10/2002 | Rowe et al. | 707/102 |
| 6,507,846 B1 | * 1/2003 | Consens | 707/100 |

FOREIGN PATENT DOCUMENTS

EP    WO99/04344    1/1999

OTHER PUBLICATIONS

Microsoft Internet Explorer 1995–2001.*
Dvorak, John C., *Scarier Than Spam,* Jan. 4, 1999, pp. 1–2.
De La Cruz et al., *Inside MAPI,* ©1996, pp. 528–541 (Table of Contents also included).
MSDN Library—Apr. 1999, Messaging API (MAPI), Legal Information, Developing a Message Store Provider.

* cited by examiner

*Primary Examiner*—Kim Vu
*Assistant Examiner*—Monplaisir Hamilton
(74) *Attorney, Agent, or Firm*—Oyen, Wiggs, Green & Mutala

(57) ABSTRACT

A computer-based system catalogs and retrieves electronic messages saved in a message store. The system automatically organizes each saved message into multiple folders based on the contents and attributes of the message, and implements improved methods for manually organizing messages. Unlike prior art systems, where a message exists in only one folder, the system uses lightweight message shortcuts to display the message in multiple folders simultaneously. The system preferably permits messages to be organized by: 1) basic message and attachment properties, e.g. date, status, attachment type; 2) extended message properties that the user can specify, e.g. keywords; and 3) correspondent or bulk mail sender/recipient, with automatic separation of bulk mail from correspondence. Performance and usability are improved by performing reads incrementally and by providing multiple sorting keys.

34 Claims, 33 Drawing Sheets

76

THIRD LAYER - Correspondence and Bulk Mail Organization

- Separate Correspondence from Bulk Mail
- Automatic organization of Correspondence
- Bulk Mail organization by sender or recipient
- Manage Correspondent and Bulk Mail folders

74

SECOND LAYER - Applications of Lightweight Message Shortcuts

- Automatic organization by Status
- Automatic organization by Date
- Automatic organization by Attachment
- Automatic organization by user assigned Keyword
- Improved manual organization in user created folders
- Improved filtering mechanisms
- Improved handling of search results

72

BASE LAYER - Base Services

- Catalog database
- Unified view of multiple Message Stores
- Catalog Server Requests and Events
- Lightweight message shortcuts
- Timed Shortcuts
- User created Shortcuts
- User excluded Shortcuts
- Incremental read of Folder contents

FIG. 7

BuildShortcut

Finish building the Shortcut object in ShortcutEntry:
-- Build SortKey is shown in FIG. 12
-- Set SortKey and SortColumn (from Folder)
-- Set IsUnread and IsCorresp (from MessageSummary)

IncrementFolderCounts

- Increment ShortcutCount
- If Shortcut.IsUnread, increment UnreadCount
- If Shortcut.IsCorresp, increment CorrespShortcutCount
- If Shortcut.IsCorresp AND IsUnread, increment UnreadCorrespCount

DecrementFolderCounts

- Decrement ShortcutCount
- If Shortcut.IsUnread, decrement UnreadCount
- If Shortcut.IsCorresp, decrement CorrespShortcutCount
- If Shortcut.IsCorresp AND IsUnread, decrement UnreadCorrespCount

UpdateFolder

- Update Folder in Catalog database
- Generate FolderChanged Event

FIG. 11B

SHORTCUT STRUCTURE

| Byte Offset | Length | Field |
|---|---|---|
| 0 | 4 | MessageId |
| 4 | 2 | AttachId |
| 6 | 4 | FolderId |
| 10 | 6 | SortKey |
| 16 | 1 | SortColumn |
| 17 | 1 | TriggerAction |
| 18 | 4 | TriggerDateTime |
| 22 | 1 | Flags |
| 23 | 1 | IsCorresp |

FLAGS ENCODING

| Bit | Length | Field |
|---|---|---|
| 0 | 1 | SortDirection |
| 1 | 1 | IsUnread |
| 2 | 1 | IsUserShortcut |

| FIELD TYPE | SORT KEY FORMAT | Notes |
|---|---|---|
| UnicodeString | UCW1 \| UCW2 \| UCW3 | Unicode Character Weights of first 3 characters of string. |
| AnsiString | C1 \| C2 \| C3 \| C4 \| C5 \| C6 | Values of first 6 characters of string. |
| DateTime | YY \| MM \| DD \| hh \| mm \| ss | YY = Year - 1950 |
| Enumeration OR Boolean (sdDescending) | Value \| YY \| MM \| DD \| hh | YY = Year - 1950 |
| Enumeration OR Boolean (sdAscending) | Value \| 255-YY \| 255-MM \| 255-DD \| 255-hh | YY = Year - 1950 |
| Integer32 OR Integer16 | Bits: 31-24 \| 23-16 \| 15-8 \| 7-0 \| Not Used | Bits are numbered with 0 being the least significant and 31 the most significant. |

FIG. 12

Contains all tables and fields of Base Layer, plus the following:

```
Root
    |--- Status
    |       |--- Active Mail
    |       |--- Deleted
    |       |--- Drafts
    |       |--- Kept
    |       |--- Received
    |       |--- Sent
    |       |--- Tagged
    |       |--- To Do
    |       |--- Unread
    |       |--- Waiting Send
    |
    |--- Date
    |       |--- Today
    |       |--- Yesterday
    |       |--- This Week
    |       |--- Last Week
    |       |--- * Automatically created Month folders
    |
    |--- Attachment
    |       |--- All Attachments
    |       |--- * Automatically created AttachmentType folders
    |
    |--- Keyword
    |       |--- * Automatically created Keyword folders
    |
    |--- Search Results
    |       |--- * Search Results folders
    |
    |--- User Folders
    |       |--- * User created folders
    |
```

FIG. 17

Contains all tables and fields of Base Layer and Second Layer, plus the following:

AlternateKey1
= AddressString
 (uppercase)

AlternateKey2
= FolderId

Contains all Folders in Base Layer and Second Layer, plus the following:

```
<Root>
   |--- Correspondents
   |      |--- Me
   |      |--- * Automatically created Correspondent folders
   |      |--- * User created Correspondent folders
   |
   |--- Bulk Mail
   |      |--- Unsorted
   |      |--- * User created Bulk Mail folders
```

FIG. 19

Includes all Requests and Events in Base Layer and Second Layer, plus the following:

SYSTEM FOR MANAGING AND ORGANIZING STORED ELECTRONIC MESSAGES

FIELD OF THE INVENTION

This invention relates to electronic messaging systems and, in particular relates to systems for managing and organizing electronic messages. Messages may be e-mail messages, voice mail messages, digitized faxes or the like. Specific aspects of the invention provide computer-implemented methods for managing and organizing electronic messages, computer systems for managing and organizing electronic messages, and computer-readable media containing computer instructions which, when executed by the computer cause the computer to perform a method according to the invention.

BACKGROUND OF THE INVENTION

Electronic messaging, which includes electronic mail (or "e-mail") messaging, is now an accepted, and some would say vital, medium for business and personal communications. The rapid growth of electronic messaging is expected to continue. This growth brings an increasingly serious problem of how to manage the volume of messages. According to a 1998 Pitney Bowes survey, 71% of respondents said they felt overwhelmed by the number of messages they receive. This problem is becoming more severe. John Dvorak, a frequent writer on the topic of computing states in PC Computing magazine that "... we have poor tools to sort and organize (or even find) the e-mail we collect".

Electronic messages, which may include attachments of diverse kinds, are sent and received through the use of messaging software. For example, e-mail messages are sent and received by e-mail software such as Microsoft's OUTLOOK™ or Netscape's COMMUNICATOR™. Other widely used types of electronic messaging are voice mail, fax and instant messaging. The vast majority of current messaging software is based on design principles that originated when message volumes were low. Current e-mail software, for example, provides rudimentary features for organizing e-mail messages (both incoming and outgoing) into various folders. The most basic model saves received messages in an Inbox folder, messages waiting delivery in an Outbox folder, and sent messages in a Sent Messages folder. Users can create additional user folders to which they can move or copy messages. Refinements to this basic model include providing additional system folders such as Drafts and Wastebasket folders. In general, the user is responsible for moving e-mail messages between folders and for managing the messages once they have been placed into a folder. This can be an onerous responsibility, especially in cases where the user receives large volumes of e-mail messages as may easily occur, for example, if the user subscribes to one or more high volume mailing lists.

A fundamental weakness of this folder/message model is that a message can only exist in a single folder at a time. While a user can place copies of e-mail messages into multiple folders the user must manage the copies separately. If the user wishes to see a message in multiple folders, then he or she must make multiple copies of the message, which results in using additional storage space and in creating more messages that need to be managed. This model also requires that the user manually organize each message. This can lead to cluttered folders and a general lack of organization in the stored e-mail messages that a user accumulates over time.

Further, once an e-mail message has been received it can be difficult to find the message later, especially if there are many folders into which the message could have been placed. This is frustrating and inefficient for the user.

Some current electronic mail software is capable of filtering incoming e-mail messages by applying a series of rules. The filtering rules may be automatically executed each time a message is sent or received. The current version of Microsoft Outlook has a facility which allows users to create such rules, for example. U.S. Pat. No. 6,057,841, Thurlow et al., describes a system for applying a set of electronic message processing rules for managing incoming and outgoing electronic messages. U.S. Pat. No. 5,377,354, Scannell et al., also describes a rules-based filtering mechanism.

Rules can execute specific tasks when user-defined criteria are met. Rules can be used to process electronic messages without requiring users to spent a lot of time sorting through their inboxes deleting, filing, and responding to their messages. While filter rules are powerful, they are also difficult to use because they are typically implemented as a series of instructions against which each message is evaluated. If the number of rules exceeds a relatively small number the overall rule set becomes very difficult to understand. Another disadvantage is that rules must be created manually and can involve a significant amount of effort if a user wants to organize their messages in a thorough manner, such as by correspondent. A further disadvantage is that e-mail systems which apply filtering rules are typically restricted by the folder/message model and cannot organize a message into multiple folders without creating multiple copies of the message. As a result of the foregoing disadvantages many users do not bother to set up such rules. Even when the rules have been set up they act only when a message is sent or received. Such rules are incapable of managing messages after they have been received or sent.

Other features which software vendors have provided in an attempt to help users organize their messages are keywords (also referred to as "categories"), tags (also referred to as "flags"), searching tools, and links to other objects such as task lists. While these features improve the manageability of e-mail they are less powerful than filtering rules and have proven inadequate for dealing with higher message volumes.

Keywords and tags let a user highlight and identify messages to distinguish them from other stored messages. A major drawback to these mechanisms is that the highlighted messages are visible only in the folder to which the message belongs. The value of these mechanisms is significantly reduced because there is no fast and convenient way to locate all tagged messages or all messages that have been assigned a given keyword.

Searching is an important tool in dealing with large message volumes. Traditional sequential search techniques are usually too time-consuming to make them very useful for larger message stores. As a result, there have been recent efforts to provide systems which implement full-text indexing and retrieval capabilities for message stores. While searching is an important technique for finding previously sent or received messages, it is not particularly useful or efficient for dealing with messages as they are received and then handled by the user. A search must be performed each time a user wishes to access messages which match a particular set of search criteria. The user is generally forced to manually enter the search criteria. Once a search has been run the results of the search may be placed into a separate "search results" folder (in addition to the folder in which the original message resides). Search results folders are not generally useful for organizing electronic messages because of their limited capabilities. Such folders cannot form the basis for a more general purpose solution for organizing messages into multiple folders. For example the Microsoft Platform SDK describes some limitations of MAPI search results folders as follows:

The only way that the contents of a search-results folder can be modified is through the IMAPIContainer::SetSearchCriteria call;
  Messages cannot be moved or copied into or out of search-results folders; and,
  Search-results folders cannot contain subfolders.

Some software packages allow objects to be linked to gone another. For example, Microsoft Outlook 2000 has a task list. A user can add a shortcut to an electronic message to a task. Outlook 2000 does not provide any facilities to act on the message to which the shortcut refers. The Outlook 2000 task list is not flexible enough for use in the effective organization of electronic messages.

A number of attempts have been made to overcome problems associated with the current folder/message model. These include U.S. Pat. No. 5,948,058, Kudoh et al., which describes a method for cataloging a message into multiple categories. An array of bitmaps in the message is used to identify the categories to which a message belongs. This is a very simple implementation that would have serious performance problems when searching for all messages that belong to a category—all messages in the message store would need to be examined.

U.S. Pat. No. 6,029,164, Birrell et al., describes a method for adding labels to messages which are then indexed by a full-text index and retrieval engine. An advantage of the Birrell et al. system over the system of Kudoh et al. is that it provides a rapid global search capability for finding messages with the desired label, and provides the ability for the user to add, modify or delete labels. Some disadvantages of the Birrell et al. system are that messages are processed in batches (for performance reasons) so the index is not always current. Further, a user must execute a search to find messages associated with the desired label.

Miller et al, PCT patent publication No. WO99/04344 disclose an e-mail system in which messages can be accessed in a correspondent-centric manner. The Miller et al. system uses a relational database to organize messages. The underlaying database structure is conventional in design and has a Correspondent table, a Message table and a Message-Correspondent Relationship table. While Miller et al. do provide a system which addresses some of the problems addressed above, Miller et al. do not provide a general solution to the problem of organizing a store of electronic messages. Some shortcomings of the Miller et al. system are as follows:

a separate set of tables is required for each field by which messages are to be organized. The system disclosed by Miller et al. only permits messages to be organized by topic and correspondent;
  messages are organized by e-mail address—no support is provided for grouping messages by correspondent where the correspondent has multiple e-mail addresses;
  the list of correspondents can become cluttered with persons with whom no real correspondence is conducted. For example, a large number of correspondent entries would be created if the user accidentally performs a "Reply All" operation on a message that has a large distribution list of unknown correspondents.
  bulk mail is processed in an identical manner to personally addressed mail.
  messages can be read from the database only in ascending MessageId sequence.

There exist computerized systems for organizing data files of various kinds. However, these systems are, in general, not well adapted for use in organizing electronic messages. Some examples of file management systems are described in U.S. Pat. No. 5,544,360, Lewak et al.; U.S. Pat. No. 5,899,995, Millier et al.; and, U.S. Pat. No. 6,009,442 Chen et al.

There is a need for systems and methods which can automatically organize stored electronic messages, such as e-mail messages, instant messages, voice messages and fax messages. There is a particular need for such systems and methods which include tools for automatically managing stored messages. Any such system must be fast. Users are generally unwilling to wait for a messaging system to generate a list of electronic messages in a particular folder. There is particular need for systems which allow a user to quickly locate a message or group of messages of interest especially given the ever increasing load of messages that many users have to deal with. Ideally such systems should help users to separate important messages from less important messages and to manage the flow of messages.

SUMMARY OF THE INVENTION

This invention provides a computer-based system for cataloging, retrieving and manipulating electronic messages saved in a message store. Preferred embodiments of the system may be used to automatically organize each of a large number of saved message into multiple folders based on the contents and attributes of the message as well as to facilitate the manual organization of messages. Apparatus according to the invention provides a relational database which uses lightweight message shortcuts to make individual messages available in multiple folders simultaneously. The invention can advantageously be integrated with messaging client software and/or messaging server software, such as e-mail software, to facilitate the organization of electronic messages.

One aspect of the invention provides a method for organizing electronic messages comprising: providing an electronic message, the electronic message comprising a plurality of properties; and, generating a plurality of shortcuts to the electronic message, each of the shortcuts comprising a record in a database, each record comprising a FolderId value associating the shortcut with a different one of a plurality of folders and a MessageId value associating the shortcut with the message.

Further features and advantages of the invention are described below.

BRIEF DESCRIPTION OF THE DRAWINGS

In drawings which illustrate non-limiting embodiments of the invention,

FIG. 7 schematically illustrates three functional layers of a preferred embodiment of the invention;

FIGS. 11A and 11B together provide a flowchart that shows how an individual shortcut can be added, changed or deleted in a catalog database;

FIG. 12 discloses the structure of a shortcut, including details of the structure of the SortKey;

FIG. 17 depicts a possible folder-tree structure, showing folders which can be used in providing the second layer of functionality;

FIG. 19 depicts a possible folder-tree structure, showing additional folders that may be used in providing the third layer of functionality;

LIST OF REFERENCE NUMERALS

Figure 1A:
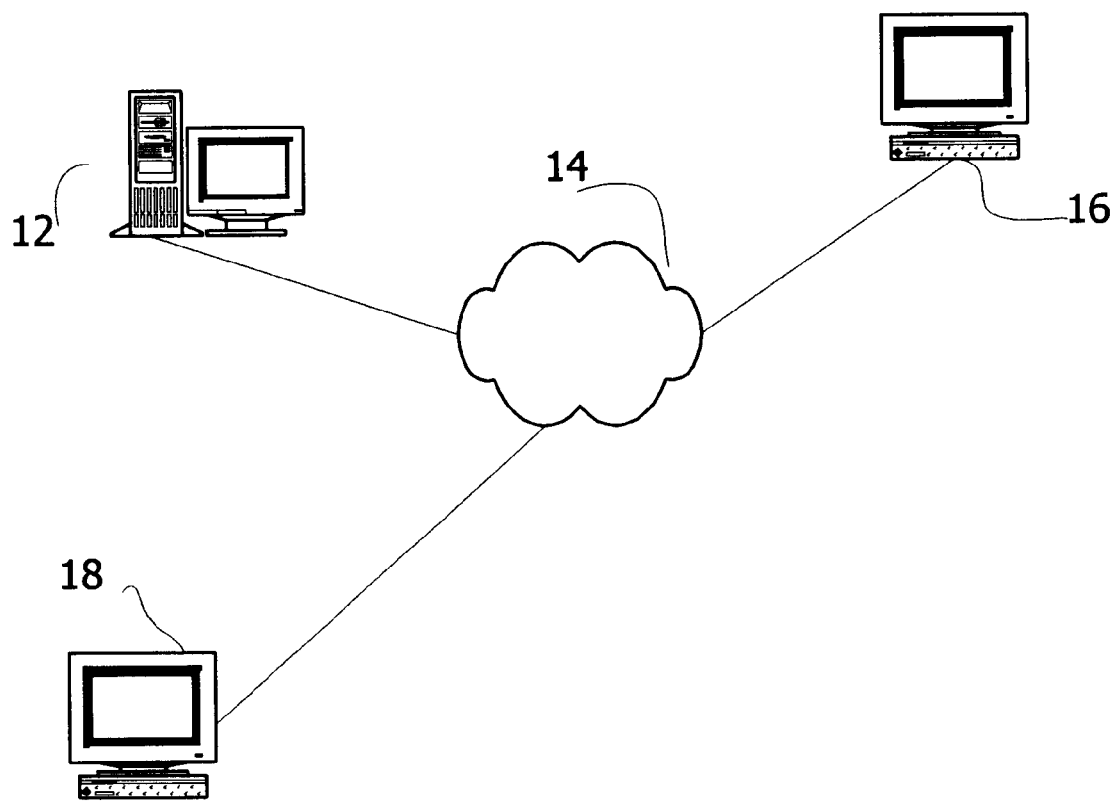
FIG. 1A is a schematic view of an example computer network which includes a user computer on which electronic messages are received and stored.

| | |
|---|---|
| 11 | data store |
| 12 | server computer |
| 13 | processor |
| 14 | network |
| 15 | user interface |
| 16 | user computer |
| 17 | interface device |
| 18 | user computer |
| 19 | shortcut |
| 20 | system |
| 22 | electronic message |
| 23 | message store |
| 24 | message store server |
| 25 | user interface device |
| 26 | message transport server |
| 27 | message client |
| 28 | catalog database |
| 29 | catalog server |
| 32 | envelope |
| 33 | transport header |
| 34 | status and organizational information |
| 36 | message contents |
| 36A | attachments |
| 38 | folder |
| 40A, 40B, 40C | system |
| 50 | storage object |
| 51 | StoreLink table |
| 51A | StoreId |
| 52A | StoreMessageId |
| 52B | StoreLinkId foreign key |
| 52, 52' | MessageSummary table |
| 53, 53' | AttachSummary table |
| 53A | StoreAttachId foreign key |
| 54, 54' | Message table |
| 55, 55' | Attach table |
| 56 | Folder table |
| 57 | Shortcut table |
| 58 | Address table |
| 60 | display |
| 61 | folder panel |
| 61A | representation of folders |
| 62 | tabbed dialog |
| 62A | date tab |
| 62B | correspondents tab |
| 62C | hot tab |
| 64 | messages panel |
| 65 | column header |
| 66 | message header display panel |
| 67 | message contents display panel |
| 68 | tool button |
| 69 | status bar |
| 72 | base layer |
| 74 | second layer |
| 76 | third layer |
| 100 | ShortcutArray |
| 100A | ShortcutEntry |
| 101 | method |
| 102 | read shortcuts |
| 103 | execute automatic organization rules |
| 104 | execute filter rules |
| 105 | execute correspondent and bulk mail rules |
| 106 | process FolderExcludeList |
| 107 | process Shortcut Entries |
| 108 | search ShortcutArray |
| 108A | create new ShortcutEntry |
| 108B | set ShortcutAction |
| 108C | build ShortcutEntry |
| 110 | process shortcut (method) |
| 111 | read folder |
| 112 | add shortcut |
| 113 | update shortcut |

-continued

| | |
|---|---|
| 114 | delete shortcut |
| 115 | set shortcut timer |
| 130 | handle timed shortcuts (method) |
| 132 | initialize shortcut timer |
| 133 | read earliest TriggerDateTime |
| 134 | set shortcut timer |
| 135 | AddChangeShortcut event |
| 137 | shortcut timer event |
| 138 | perform TriggerAction |
| 140 | read folder contents (method) |
| 142 | determine if request is initial |
| 142A | check sort direction |
| 143 | set position |
| 143A | position at first shortcut in folder |
| 143B | position at last shortcut in folder |
| 144 | read shortcuts |
| 145 | determine if end of folder reached |
| 146 | determine if shortcut excluded from view |
| 147 | determine whether enough shortcuts read |
| 148 | add shortcut to data structure |
| 149 | sort |
| 150 | update SortKey (method) |
| 152 | read folder data |
| 154 | position to read shortcut |
| 155 | read shortcut |
| 156 | check for end of folder |
| 157 | determine sort column data type |
| 158, 158A | determine if new SortKey needed |
| 159 | write new SortKey |
| 160 | update folder data |
| 217 | AddressArray |
| 218 | StateCounters |
| 219 | StateFlags |
| 220 | build memory structures (method) |
| 221 | detect if message unsent |
| 222 | classify as correspondence |
| 223 | initialize data structure |
| 224 | retrieve AddressList elements |
| 225 | determine whether all elements retrieved |
| 226 | initialize AddressEntry |
| 227 | increment state counters |
| 228 | read address from catalog database 28 |
| 229 | determine if address found |
| 230 | build AddressEntry |
| 231 | set state flags |
| 235 | process AddressArray (method) |
| 236 | get next element of AddressArray |
| 237 | determine if end of array reached |
| 238 | apply rules |
| 239 | determine if shortcut to be created |
| 240 | determine if address exists in catalog database 28 |
| 240A | add address to catalog database 28 |
| 241 | determine if status of correspondent should be upgraded |
| 241A | upgrade correspondent status |
| 242 | add shortcut |
| 243 | determine if shortcuts created |
| 243A | add to unsorted folder |
| 243B | flag as correspondent message |
| 260 | move address (method) |
| 261 | determine if address to be moved to Unsorted folder |
| 262 | delete address |
| 263 | read address |
| 264 | determine if read successful |
| 265 | create address record |
| 266 | update address record |
| 267 | build AddressQueue |
| 270 | process AddressQueue (method) |
| 271A | position at first message summary |
| 271B | read next message summary |
| 271C | determine if all message summaries read |
| 272 | determine if message affected by address changes |
| 273 | process shortcuts |
| 274 | empty AddressQueue |

DETAILED DESCRIPTION

This invention relates to the organization and management of electronic messages. FIG. 1A shows a very simple computer network 14 which connects a server computer 12 and two user computers 16 and 18. The simple network of FIG. 1A is an example of one context in which the invention could be practised. Server computer 12 runs messaging server software. In this example, the messaging server is an e-mail server. However, this invention is not limited to e-mail messaging. Those skilled in the art will appreciate that the invention could be applied equally well to other types of messages or to messaging in a mixed environment handling different types of messages.

Each of user computers 16 and 18 run messaging client software. Computers 16 and 18 can exchange electronic mail messages by way of server 12 and network 14. For example a user of computer 16 may use e-mail client software to compose a message addressed to a user of computer 18. When the message is complete the user indicates to the e-mail client software that the message should be sent, for example by activating a "send" icon. Computer 16 then sends the message to server 12 on network 14. Server 12 receives the message, parses the address and forwards the message to computer 18. The message is received at user computer 18 by e-mail client software which places the message in an "Inbox" folder. The user of computer 18 can then read the message, respond to the message, delete the message, move the message to another folder, and so on. Over time the user of computer 18 may receive a large number of electronic messages from the user of computer 16 and others. By way of example, this invention could be applied to help the user of computer 18 to organize, locate and manage such messages.

In general, this invention provides a system and methods which may be practised on a computer for cataloging, retrieving and/or manipulating electronic messages. The invention can be applied to organizing any sort of electronic messages which are to be temporarily or permanently stored. The electronic messages may comprise, for example one or more types of messages selected from the group consisting of e-mail messages, voice mail messages, digitized facsimile messages, and instant messages. The invention could also be applied to any other present or future types of electronic messages. Messages may have attachments. The attachment may be any kind of attached object including things such as images, sound media, video, executable files, word processing files, web pages, scripts, or the like.

In preferred embodiments of the invention, a system according to the invention handles incoming messages as they are received. However, the invention could also be applied to the organization of messages which already exist in a message store such as an archive containing previously-received e-mail messages. The invention does not rely on any specific message format (such as RFC822 or MAPI) or any specific messaging protocol (such as SMTP or X.400), but can be readily adapted to the set of information made available by any practical message format and protocol.

Figure 1B:
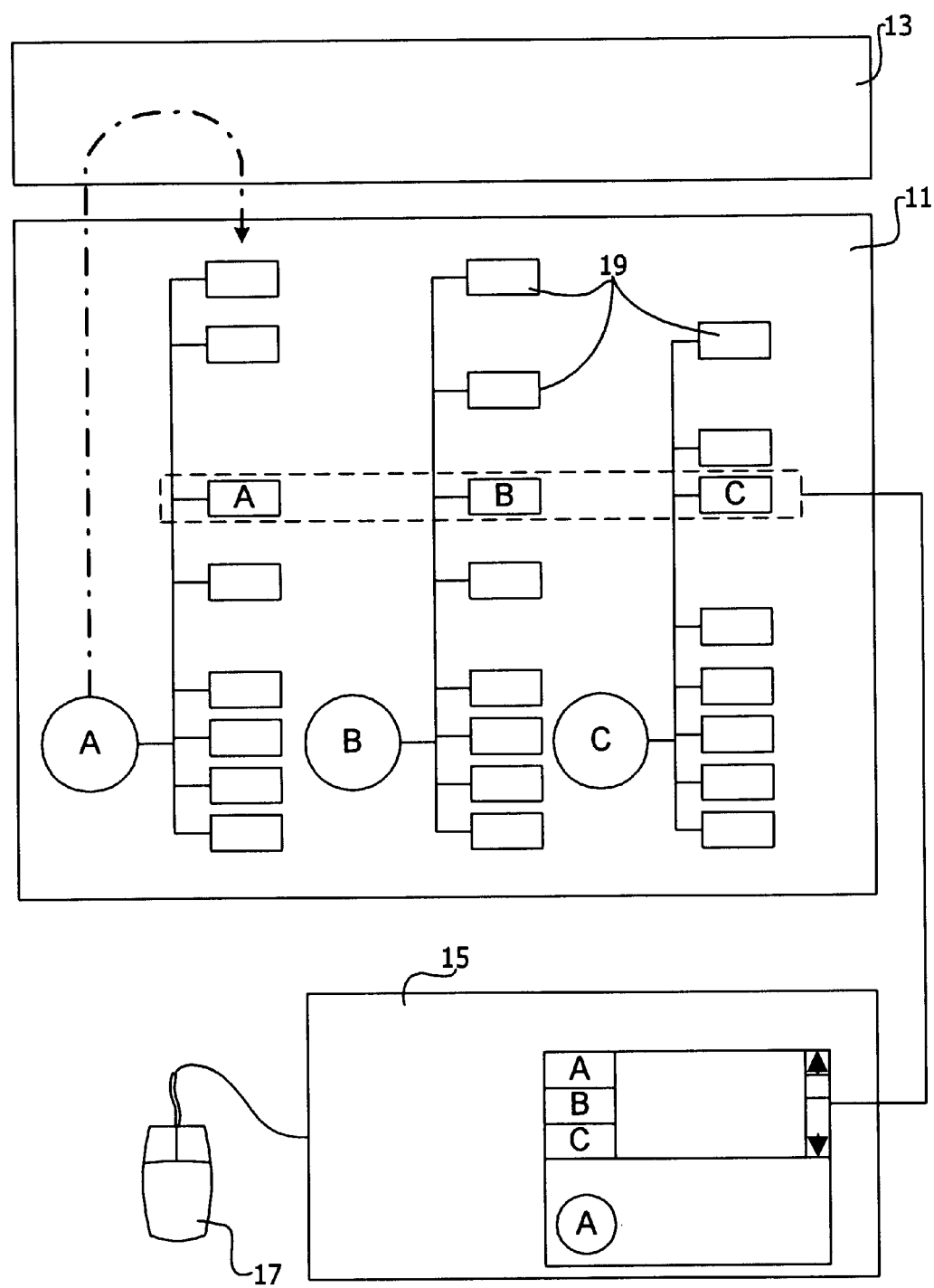
FIG. 1B is a schematic overview of a system for organizing messages according to the invention.

FIG. 1B shows a schematic overview of the invention. A data store 11 accessible to a processor 13 contains a plurality of messages A, B, C. Processor 13 executes instructions which cause it to create one or more shortcuts 19 to each of the messages in the data store 11. Data store 11 may comprise a single physical device, may comprise a distributed data store spread over two or more physical devices. Data store 11 may be a single logical device or may comprise multiple logical devices. Each shortcut 19 is associated with a folder. In FIG. 1B, horizontally aligned shortcuts 19 are in the same folder. A user interface 15 equipped with a suitable input device 17 permits a user to select a folder and to view and manipulate messages which have shortcuts in the selected folder. The shortcuts have properties which permit large numbers of messages to be effectively handled so that users do not experience unacceptable delays in sorting contents of folders in various ways or while waiting for the contents of a folder to be displayed in interface 15.

Figure 2:
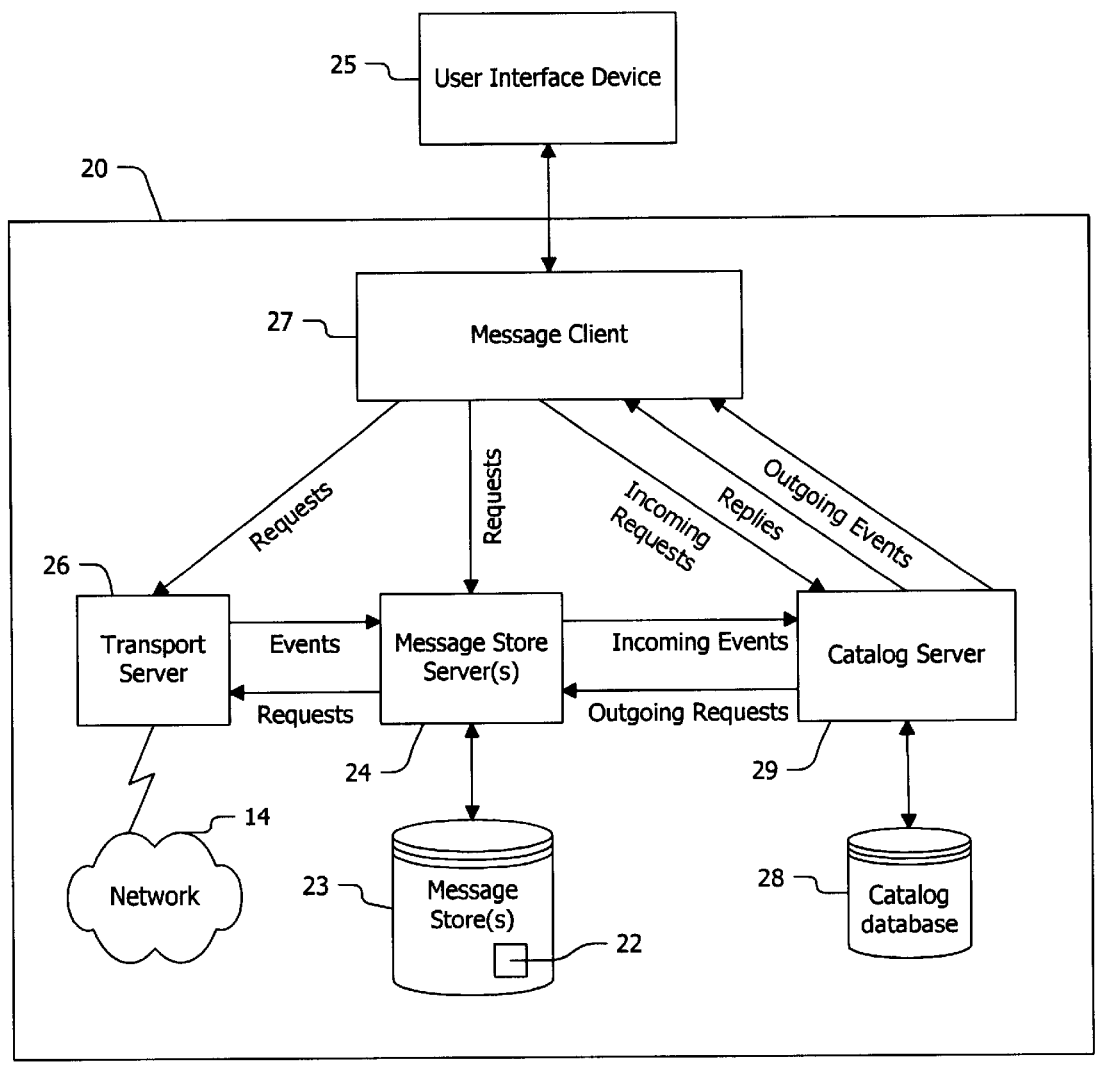
FIG. 2 is a diagram that shows schematically the logical software, storage and user interface components in apparatus according to a currently preferred embodiment of the invention.

FIG. 2 shows in more detail a preferred embodiment of a system 20 according to the invention. System 20 comprises several software components which operate in a computer system. The computer system may comprise one or more intercommunicating computers. For example, the computer system may be user computer 18 of FIG. 1A. A collection of electronic messages 22 is stored in one or more message stores 23. Each message store 23 comprises a memory, file or database structure that provides temporary or permanent storage for the contained messages 22. A message store server 24 manages the messages 22 in message store 23. Among other tasks, message store server 24 receives requests for messages 22 from other parts of system 20 and locates and provides the requested messages 22. Message store server 24 also notifies other software components of changes to message store 23 by generating events.

Message transport server 26 is a software component that sends and receives electronic messages over a communications network 14 using one or more communications and messaging protocols. Message transport server 26 responds to requests from other software components, and generates events when message transport operations either complete successfully or fail to complete.

System 20 includes a message client 27. Message client 27 provides a user interface, and receives user input from the interface. The user interface is made available by a suitable input device which typically includes a display and an input device, such as a mouse, trackball, touch screen, keyboard, voice recognition system, or the like. Message client 27 communicates user actions to server software components 24 and 26 by generating and forwarding suitable requests. In turn, message client 27 receives events from server software components that indicate changes that may need to be reflected in the user interface.

All of the foregoing components of system 20 are well known to persons skilled in the art of designing and implementing electronic message-handling systems and, for this reason, do not require further elaboration here. For example, the book *Inside MAPI* by Irving De la Cruz and Les Thaler (1999, Microsoft Press) contains detailed explanations as to how to implement message stores, message store servers (referred to as "message store providers"), message transport servers (referred to as "message transport providers"), message clients (referred to as "MAPI client applications"), and how the related requests and events can be used to coordinate the actions of these software components.

The present invention differs from the other systems described above in various respects. One area of difference is that this invention uses a catalog database 28 and preferably a catalog server 29, both as described below, to organize the contents of one or more message stores 23. Catalog database 28 is a data store that contains the information required to organize messages 22 in the associated message stores 23 into a plurality of different folders. Catalog server 29 is a software component that:

implements the organizational algorithms of the invention;

makes outgoing requests to and responds to incoming events from message store server 24;

responds to incoming requests from and generates outgoing events to message client 27.

Catalog server 29 generates a reply corresponding to each incoming request it receives from another software component (a "requester")

Figure 3:
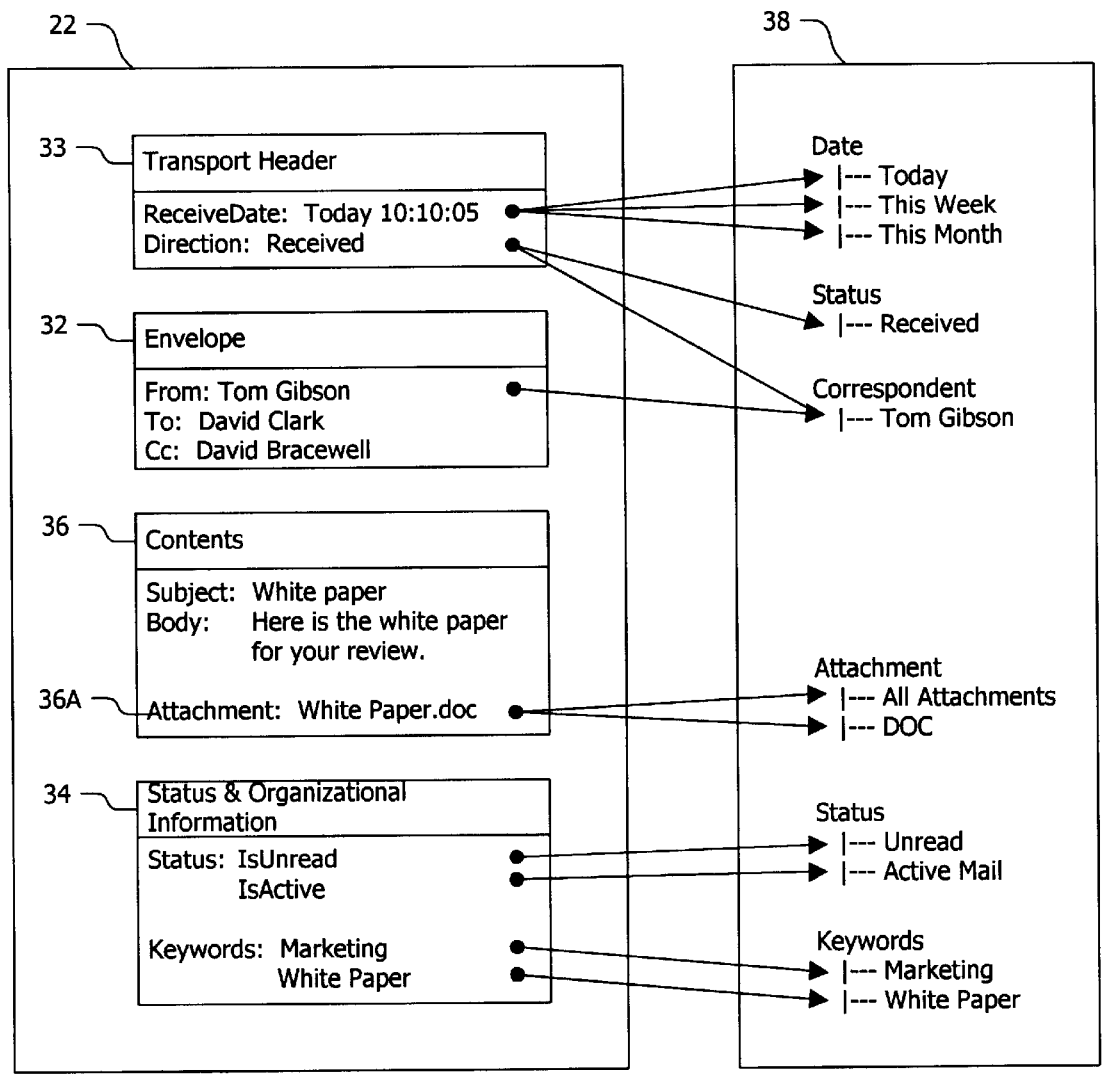
FIG. 3 is an example of how a specific e-mail message may be organized into multiple folders in a system according to the invention.

As illustrated in FIG. 3, the invention may be applied to automatically associate an electronic message with each of a large number of folders. The association may be made on the basis of any one or more criteria such as date, message status, correspondents, attachments and keywords. An advantage of the invention is that such associations may be made simultaneously on the basis of a wide range of criteria.

As shown in FIG. 3, an electronic message 22 typically contains an "envelope" 32 which contains addressing information, a transport header 33 which records how the message was transported, status and organizational information 34 that may be modified by the user, and message contents 36 which may include a message subject, body and zero or more attachments 36A. The contents of each of these elements may be made the basis for associating a particular message with one or more folders 38. Due to the complications of working with multiple folders and managing multiple copies of an electronic message it has generally been the case that only a few folders are provided. In preferred embodiments of this invention, however, a very large number of folders may be provided and automatically managed.

Figure 4A:
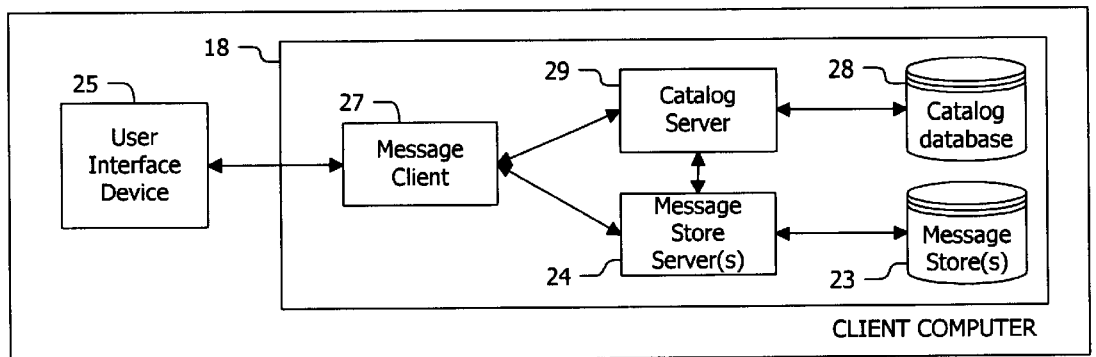
FIGS. 4A, 4B and 4C are diagrams showing three possible physical configurations for systems according to the invention.
Figure 4B:
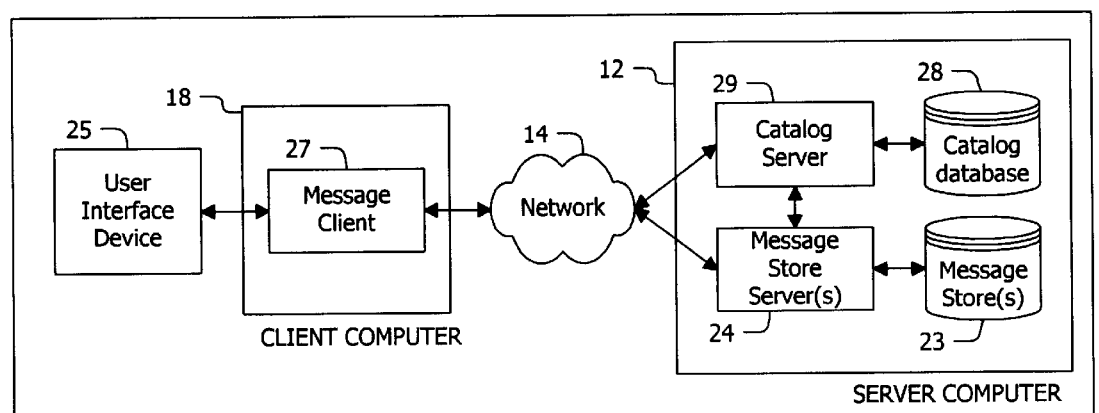
Figure 4C:
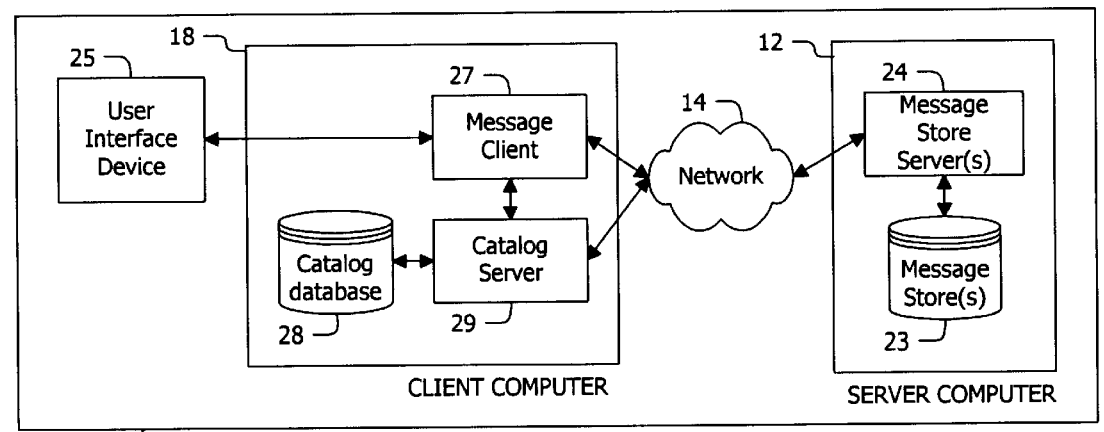

The components of the invention may be arranged in various ways on one or more computers without departing from the broad scope of the invention. FIGS. 4A, 4B and 4C show three different example configurations. In a system 40A having the first configuration, catalog server 29 and catalog database 28 are implemented on the same computer 18 as message client 27, message store 23 and message store server 24.

In a system 40B having the second configuration, message client 27 is implemented on a client computer 18, while catalog server 29, catalog database 28, message store server 24 and message store 23 are implemented on a server computer 12. Client computer 18 and server computer 12 are connected via communications network 14 which transports the necessary communications (which may be in the form of requests and events) between the message client 27 and the software components running on server computer 12.

In a system 40C having the third configuration, message client 27, catalog server 29 and catalog database 28, are all located on a client computer 18 while message store server 24 and message store 23 are implemented on server computer 12. Client computer 18 and server computer 12 are connected via communications network 14 which transports the necessary communications (which may be in the form of requests and events) between the software components running on server computer 12 and the software components running on client computer 18.

It will be readily apparent to persons skilled in the art that other configurations are possible, including hybrids of the above configurations. It is possible, for example, to provide systems wherein catalog server 29 and catalog database 28 are used to organize the contents of message stores 23 on several separate computers, all connected by a communications network. For clarity message transport server 26 has not been depicted in FIGS. 4A, 4B or 4C. A suitable message transport server would be provided to send and/or receive messages. However, the physical location of the message transport server is not relevant to the invention. The invention may be used in cases where there is no message transport server and no message transport server is required. For example, the invention may be applied to organizing archived electronic messages.

Figure 5A:
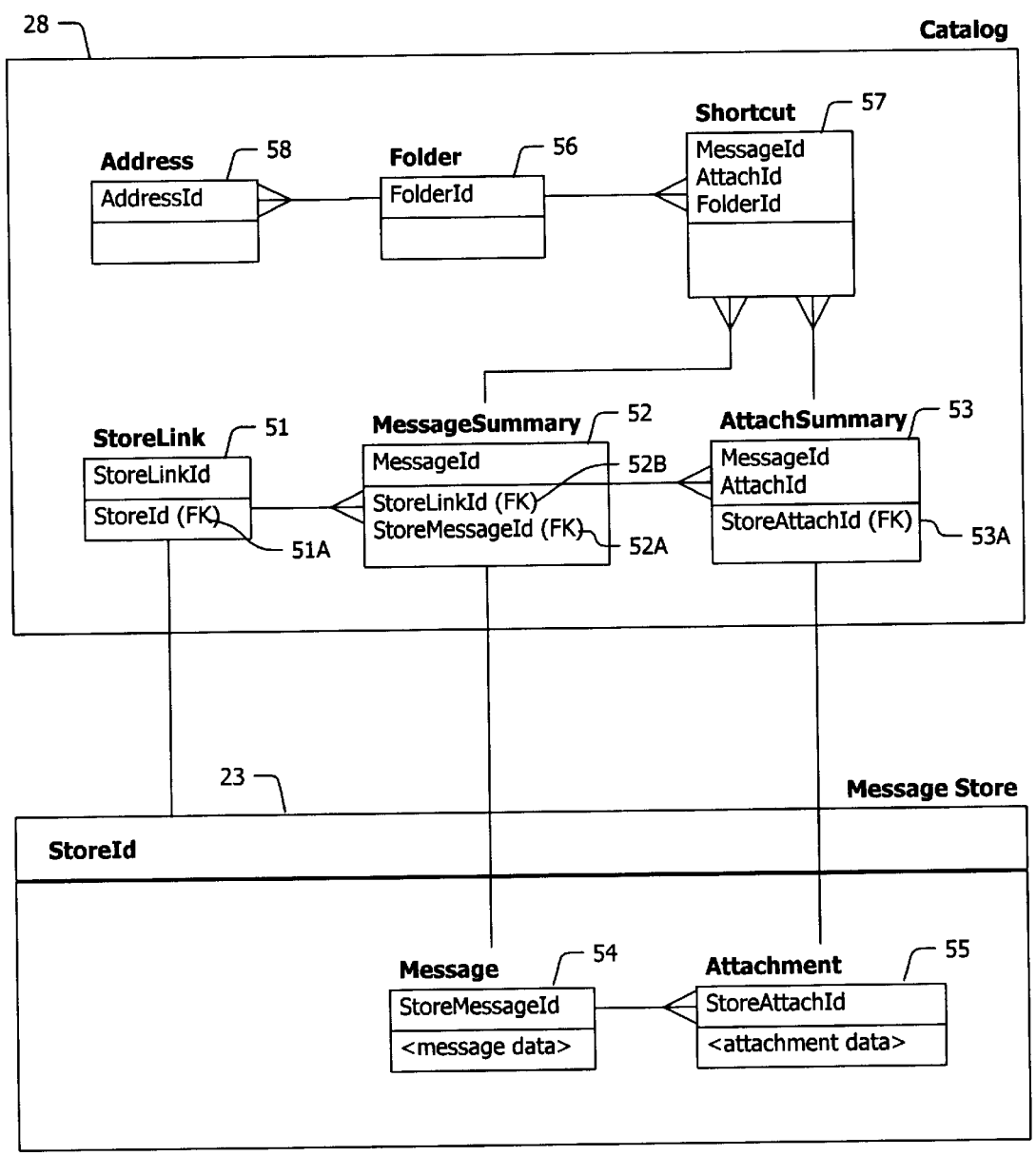
FIG. 5A is an entity-relationship diagram which illustrates a catalog and a message store implemented as separate databases.
Figure 5B:
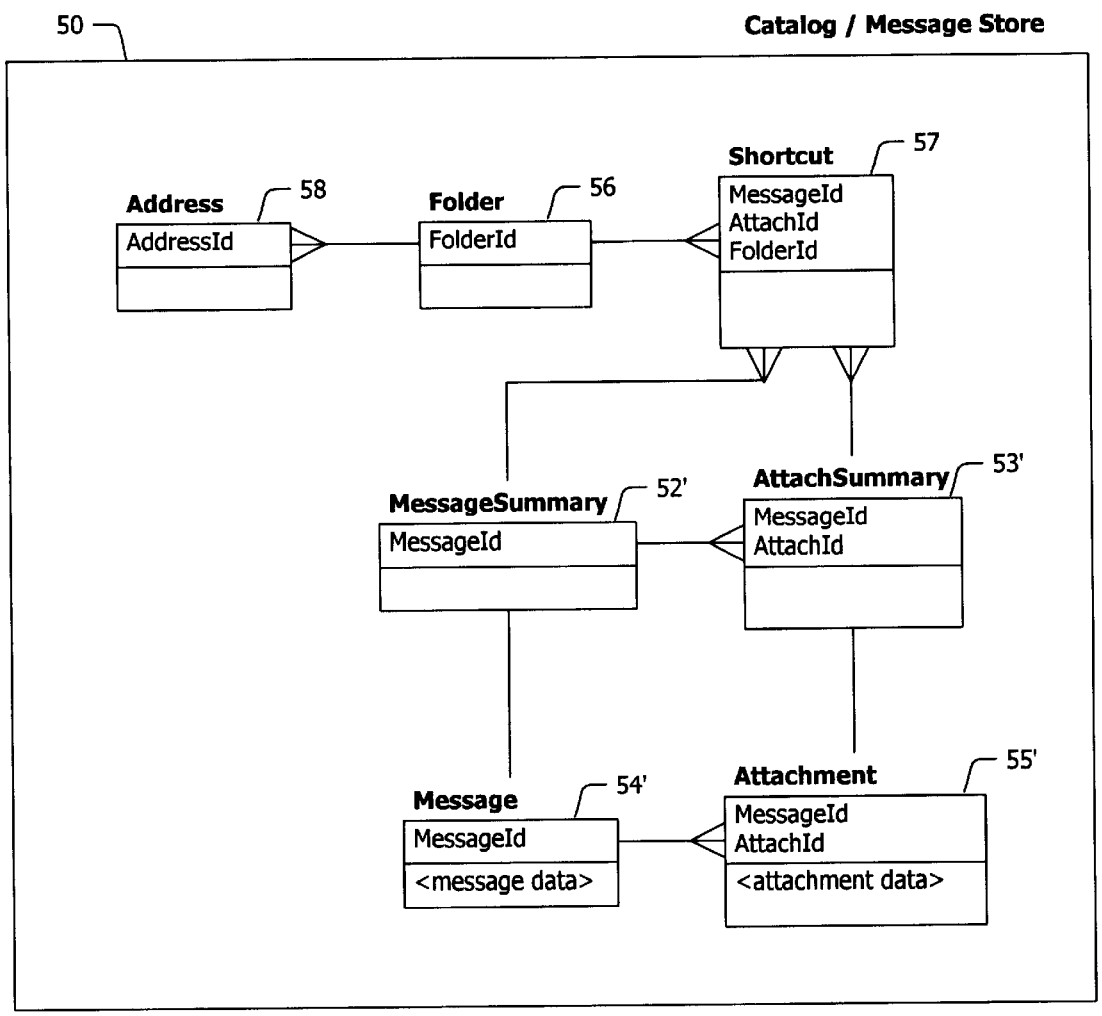
FIG. 5B is an entity-relationship diagram which illustrates a catalog and a message store implemented in a single combined database.

As shown in FIGS. 5A and 5B catalog database 28 and message store 23 may be separate from one another or may be integrated in a single integrated message store. Each of these components is preferably provided in the form of a database comprising a plurality of related tables. FIG. 5A shows how a catalog database 28 may be linked to a separate external message store 23. For the purpose of simplicity, only selected fields in these databases are shown. External message store 23 is identified by a StoreId 51A, which is a set of information required by message store server 24 to locate and provide access to the contents of the external message store 23. For example, in a MAPI environment, StoreId 51A may comprise a MAPI Profile, a valid password, and a MAPI Message Store Entry Identifier. Each message 22 represented in external message store 23 is identified by a StoreMessageId 52A—which uniquely identifies a message within external message store 23. Each message 22 may have one or more attachments 36A associated with it. Each of these attachments is identified by a StoreAttachId—which uniquely identifies an attachment within external message store 23. StoreMessageId and StoreAttachId may comprise numbers, or other identifiers, assigned to the messages and attachments respectively by message store server 24.

In FIG. 5A, catalog database 28 is linked to external message store 23 as follows. Catalog database 28 has a StoreLink table 51. Each row in StoreLink table 56 contains the StoreId 51A of a linked message store 23. The catalog server 29 can use StoreId 51A to create a session with the message store server 24 for the linked message store 23. Catalog database 28 also has a MessageSummary table 52 which contains the StoreMessageId 52A of messages in message store 23. MessageSummary table 52 is related to StoreLink table 51 by means of a StoreLinkId foreign key 52B. In the illustrated embodiment, messages 22 are stored in a Message table 54 in message store 23 and attachments are stored in an Attachment table 55 in message store 23.

Using the StoreMessageId 52A and the related StoreId 51A, catalog server 29 can make requests to the message store server 24 to read messages from message store 23. Catalog database 28 also has an AttachSummary table 53 which contains a StoreAttachId foreign key 53A which identifies attachments to messages in message store 23. Catalog server 29 can use StoreAttachId foreign key 53A to make requests to message store server 24 for attachments stored in message store 23.

Catalog server 29 can also use the StoreId 51A, StoreMessageId 52A and StoreAttachId 53A values to map events generated by message store server 24 to the matching row within catalog database 28. For example, when a message is added to a message store 23, the message store server 24 assigns a unique StoreMessageId to the message and generates an event which informs catalog server 29 of the newly added message.

It will be readily apparent to a person skilled in the art that the message store and catalog database could be separate from one another, as illustrated in FIG. 2, could be united in a single database, or distributed between a number of linked databases. The general scheme described above can be applied to any particular message store 23 and message store server 24. For example, FIG. 5B is an entity-relationship diagram for a storage object 50 which integrates both a catalog database and a message store which is linked to the catalog. The message store is part of the same storage object 50 as the catalog. For the purpose of simplicity, only selected fields in storage object 50 are shown. Storage object 50 has a MessageSummary table 52' and a Message table 54 which share the same primary key. Similarly, storage object 50 has an AttachSummary table 53' and an Attachment table 55' which share the same primary key. As a result, the mapping of MessageSummary to Message and the mapping of AttachSummary to Attachment is a trivial exercise within a relational database environment.

Figure 6:
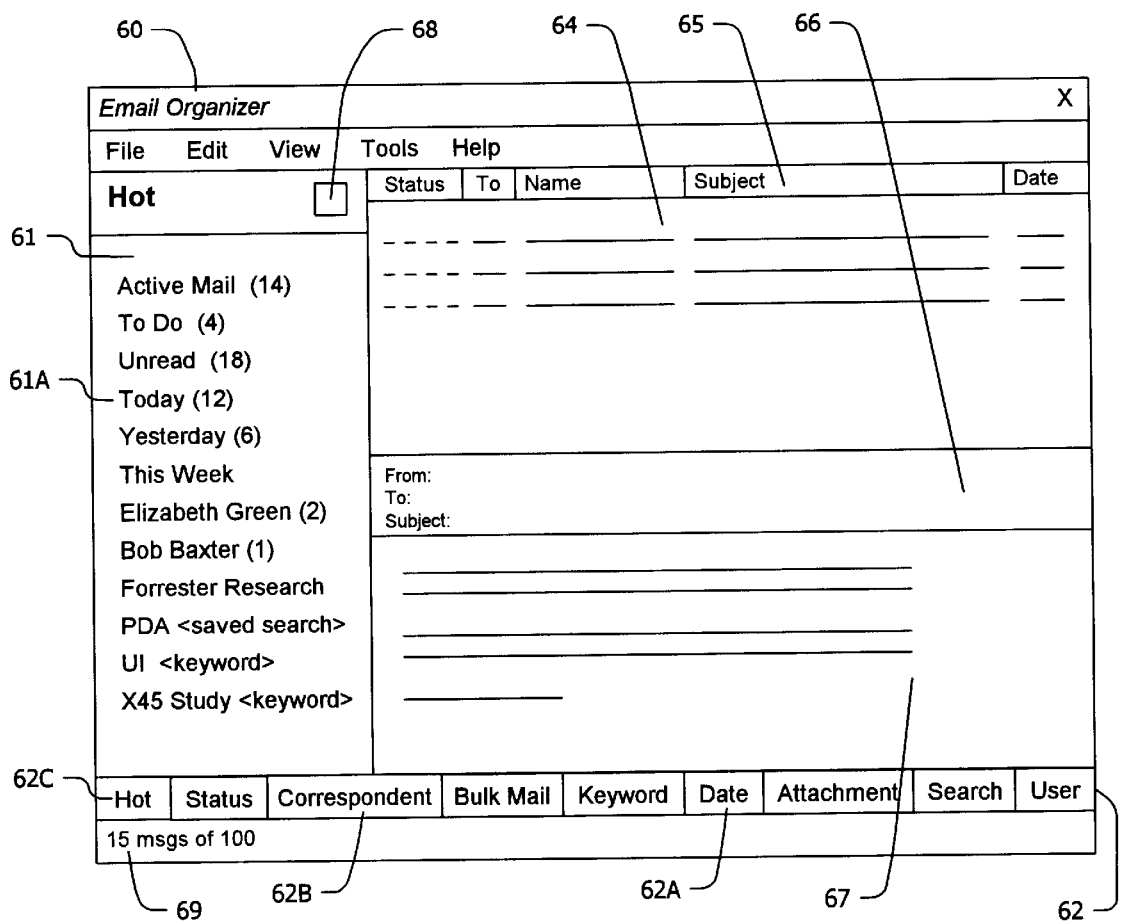
FIG. 6 is an example of a screen display for a user interface that shows folders and messages in multiple views.

FIG. 6 illustrates a possible user interface for use with the invention. The user interface comprises a display 60 which could be used to allow a user to access messages at a desktop or laptop computer. Display 60 has a folder panel 61 in which is displayed a representation 61A of one or more folders. In the illustrated embodiment, representations 61A comprise a display of the name of each folder. In the preferred embodiment, representations 61A indicate the number of unread messages within each folder. In the illustrated embodiment the representation 61A includes a number in parentheses to the right of the name of the folder, with the number equal to the number of unread messages in the folder. For special purpose folders, such as "Drafts" or "To Do" the number preferably is equal to the total number of messages in the folder instead of the number of unread messages in the folder.

A tabbed dialog 62 permits a user to select which group of folders is displayed in panel 61 by selecting one of the tabs of dialog 62. A tab of dialog 62 may, for example, identify a subtree of folders defined in catalog database 28. For example, when the interface detects that a user has selected the date tab 62A (e.g. by clicking on date tab 62A, the interface displays a "date" subtree in folder panel 61. The date subtree contains folders in which messages are arranged by date. For example, the date subtree might contain folders named "Today", "Yesterday", "This Week", "Last Week" each containing appropriately selected messages. When the interface detects that a user has selected the "correspondents" tab 62B then the interface displays folders in panel 61 in which messages are sorted by correspondent, and so on.

Preferably the interface permits a user to designate and select "Hot" folders. A "Hot" folder is a folder that the user has designated as being "hot" or important to them. Any folder in the system can be made "hot". In the illustrated embodiment, dialog 62 includes a "Hot" tab 62C. When the interface detects that a user has selected hot tab 62C, then the interface displays in panel 61 all of the folders that the user has designated as being "Hot". Panel 61 shown in FIG. 6 displays a list of hot folders.

Interface 60 includes a message list panel 64. When the interface detects that a user has selected a particular folder, such as the Today folder, the interface displays the contents of the selected folder to be displayed in a suitable format in panel 64. In the illustrated embodiment, panel 64 displays a list of messages with one row displayed for each message. The fields within the row are displayed as separate columns and are controlled using a column header 65 which has one section for each column. When the interface detects that a user has selected a particular section in column header 65, the interface sorts the list being displayed in panel 64 by the default sort order for the column (usually in ascending sequence). The interface preferably permits a user to request that the messages be displayed in a reverse order. For example, repeatedly selecting a particular section of column header 65 may cause the interface to toggle between ascending and descending sort orders.

Display 60 includes a message header display panel 66 and a message contents display panel 67. When the interface detects that a user has selected a specific message, for example by clicking on a row in the list in panel 64 then the interface displays selected information about the associated message in message header panel 66 and displays the body of the associated message in the message contents panel 67.

The interface preferably includes a control which permits a user to select between a first mode in which all messages in a folder can be viewed and a second mode in which only messages from recognized correspondents are available for viewing. In the illustrated embodiment, display 60 includes a tool button 68. Depending upon whether or not the interface detects that a user has activated tool button 68 the interface either permits all messages in a folder to be displayed in panel 64 or displays in panel 64 only messages from recognized correspondents. If all messages are selected, then a status bar 69 displays a count of the messages in the folder. If correspondent messages only are selected then status bar 69 displays both the number of correspondent messages and the total count of messages in the folder. Preferably, in the second mode, the representation 61A includes the number of unread correspondent messages in the folder instead of the number of unread messages in the folder.

Many other types and designs of interface may be used with the invention. Creating such interfaces is within the routine skill and knowledge of those skilled in the art of designing messaging systems and will not be described further. The following description is with reference to an embodiment of the invention in which the message store 23 contains e-mail messages and the computer system 18 has a user interface device capable of supporting a display 60 as shown in FIG. 6.

For the purpose of clarity the detailed operation of the invention will be described with reference to three functional layers, each of which builds upon the functionality of the lower layer(s). FIG. 7 is a block diagram that shows these functional layers. A base services layer 72 implements the base services needed to organize messages into multiple folders and to communicate with other software components. A second layer 74 provides logic for automatically organizing messages into a number of specific folders. A third layer 76 associates messages with individual correspondents and applies rules to distinguish between correspondents with whom the user of the system has been corresponding directly and others.

Figure 9:
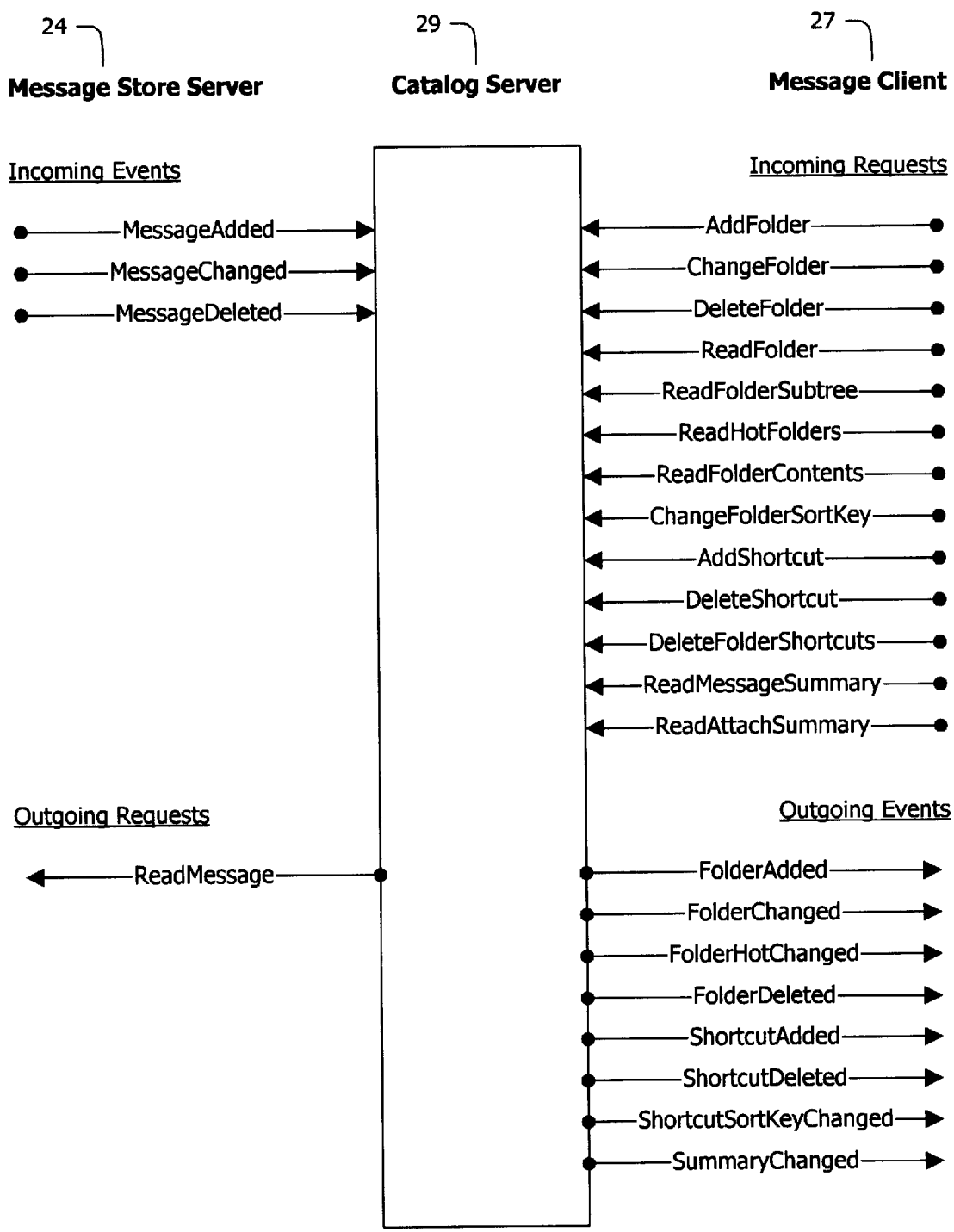
FIG. 9 is a diagram illustrating requests and events generated or handled by a catalog server in providing the base layer of functionality in a preferred embodiment of the invention.

As shown in FIG. 9, base layer 72 involves requests and events exchanged between catalog server 29 and other software components as well as methods for processing incoming requests and events and for generating outgoing requests and events. The methods of base layer 72 operate directly on elements of catalog database 28.

Catalog database 28 may be implemented using any suitable database manager software. For example, any one of a number of commercial industry-standard database managers could be used to implement catalog database 28. Catalog database 28 comprises a number of tables. In the illustrated embodiment of the invention there is a Folder table 56, a Shortcut table 57, a MessageSummary table 52, and an AttachSummary table 53. The relationships between these tables are as follows:

one-to-many between Folder table 56 and Shortcut table 57, one-to-many between MessageSummary table 52 and Shortcut table 57, one-to-many between AttachSummary table 53 and Shortcut table 57, and, one-to-many between MessageSummary table 52 and AttachSummary table 53.

Figure 8:
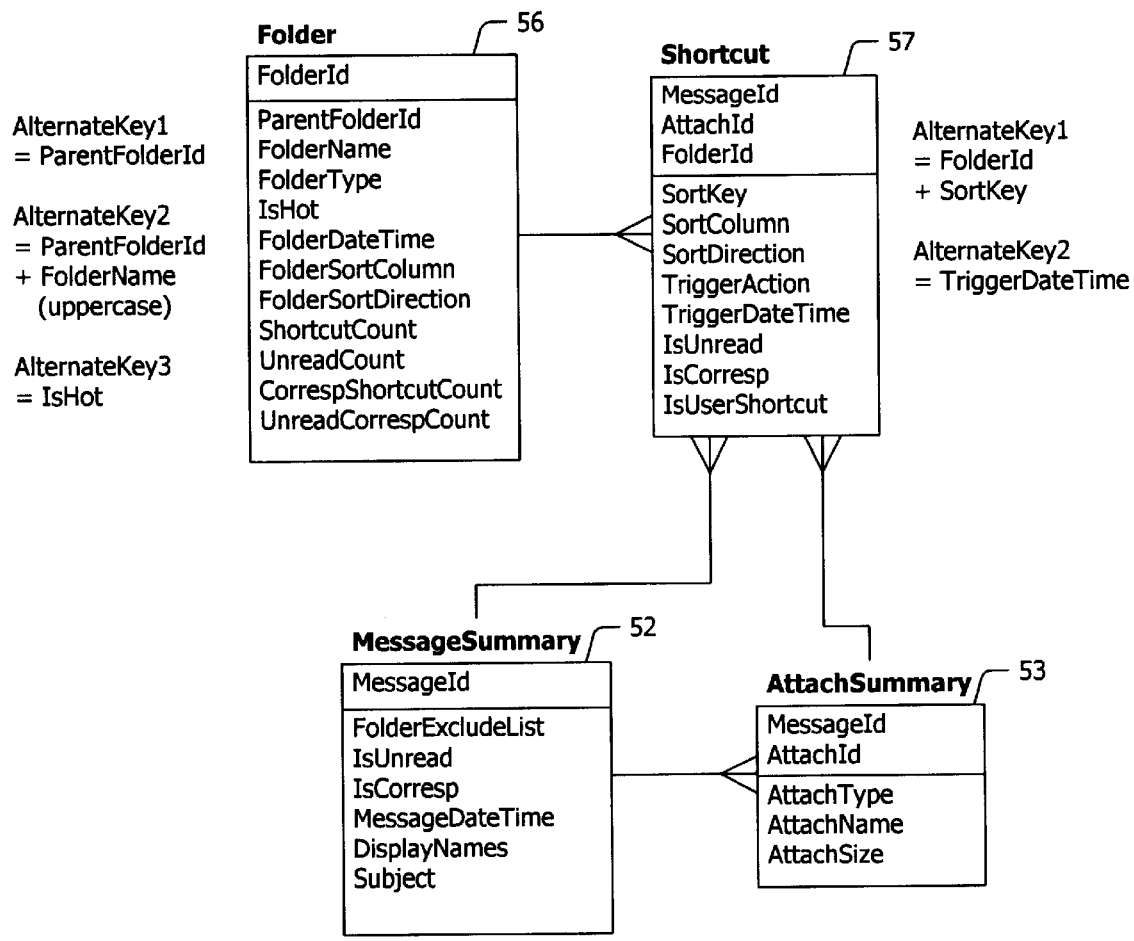
FIG. 8 is an entity-relationship diagram of a catalog database, showing elements capable of supporting a base layer of functionality according to the invention.

In addition to the tables and fields shown in FIG. 8, which are more fully documented below, catalog database 28 contains tables and fields of either FIG. 5A or FIG. 5B depending on whether catalog database 28 is separate from or integrated with message store 23.

A description of the tables and fields used in base layer 72 follows. Folder table 56 preferably implements a hierarchical folder-tree structure. A folder is an abstract organizational entity. Each folder 38 can contain one or more shortcuts to messages in message store 23. Preferably, each folder 38 can contain other folders. The primary key for folder table 56 is FolderId. This key uniquely identifies a row in Folder table 56. This key may be generated automatically by catalog server 29 when a new folder 38 is created.

AlternateKey1 is ParentFolderId. This key contains a value which is the FolderId for a folder which contains the folder in question. The ParentFolderId can be used to implement a hierarchical folder-tree structure using techniques that are well known in the art. Duplicates are allowed.

AlternateKey2 is ParentFolderId+Uppercase (FolderName). This key is used to read a Folder by its FolderName, and to detect and prevent duplicate FolderName values at any given level of the folder tree. Duplicates are not allowed.

AlternateKey3 is IsHot. This key is used to mark "hot" folders for the purpose of displaying them to the user in a "hot" view. The key is not populated if IsHot is False. Duplicates are allowed.

The fields of Folder table 56 are:

| | |
|---|---|
| FolderId | A non-zero value that uniquely identifies a row in the Folder table. |
| ParentFolderId | The FolderId of the current Folder's parent in the hierarchical folder tree structure. The root Folder has a ParentFolderId of zero. |
| FolderName | The display name of the Folder. |
| FolderType | The type of Folder. Values may include, for example, ftRoot - which indicates that the folder is the root folder, ftSubRoot - which indicates that the folder is a sub-root folder which depends directly from the root folder, (it is convenient to place a category of folders within a sub-root folder, for example, all folders which contain messages selected by date and time could be contained within a "Date" sub-root folder as shown in FIG. 17), ftStatus - which indicates that the folder includes messages selected according to a criterion relating to their status, ftCorresp - which indicates that the folder includes messages selected according to a criterion relating to their correspondent, ftMe - which indicates that the folder includes messages originating from a user of the system (who may have and use multiple e-mail accounts to originate those messages), ftBulkMail - which indicates that the folder includes messages which have been identified as originating from a specific bulk mail sender (such as a mailing list), ftUnsorted - which indicates that the folder includes messages for which no correspondent or bulk mail relationships have been established, ftKeyword - which indicates that the folder includes messages selected according to a criterion relating to their keywords, ftDate - which indicates that the folder includes messages selected according to a criterion relating to their dates, ftAttach - which indicates that the folder includes |

-continued

| | |
|---|---|
| | messages selected according to a criterion relating to their attachments ftSearchResult - which indicates that the folder contains search results and ftUser - which indicates that the folder is user defined. |
| IsHot | Indicates whether the Folder is "hot" and should be displayed in a preferential manner to the user. |
| FolderDateTime | The date and time the Folder was created. |
| FolderSortColumn | The column on which the Shortcuts within a Folder should be sorted. Values depend upon which columns are displayed to the user by message client 27 and may include values such as scIsUnread - which causes messages in the folder to be sorted so that all unread messages are displayed together, scDisplayNames - which causes messages to be sorted alphabetically by the display name of the message sender or message recipient, scSubject - which causes messages to be sorted alphabetically by subject, scMessageDateTime - which causes messages to be sorted by their date and time, scAttachName which causes messages to be sorted according to the names of their attachments, scAttachSize. - which causes messages to be sorted according to the size of their attachments. |
| FolderSortDirection | The direction in which a column is sorted. Values are sdAscending, sdDescending. |
| ShortcutCount | The number of shortcuts in the folder. |
| UnreadCount | The number of unread shortcuts in the folder. |
| CorrespShortcutCount | The number of correspondent shortcuts in the folder. |
| UnreadCorrespCount | The number of unread correspondent shortcuts in the folder. |

Shortcut table 57 is a database structure which is used to provide lightweight message shortcuts. Each row in shortcut table 57 associates a MessageSummary or an AttachSummary with a folder 38. A single MessageSummary or AttachSummary may be simultaneously associated with many folders 38.

The PrimaryKey for shortcut table 57 is MessageId+AttachId+FolderId. This key uniquely identifies a shortcut. This key also permits the association of multiple shortcuts with a single MessageSummary row by means of the MessageSummary table's PrimaryKey (MessageId). This key also permits the association of multiple shortcuts with a single AttachSummary row by means of the AttachSummary table's PrimaryKey (MessageId+AttachId).

AlternateKey1 for shortcut table 57 is FolderId+SortKey. This key permits the association of multiple shortcuts with a folder by means of the folder table's PrimaryKey (FolderId). This key is also used to sort and read the shortcuts in a folder. Duplicates are allowed.

AlternateKey2 for shortcut table 57 is TriggerDateTime. This key is used to implement timed shortcuts that cause an action to be executed when the TriggerDateTime is reached. The key is not populated if TriggerDateTime is zero. Duplicates are allowed.

In this preferred embodiment of the invention, the structure of shortcut table 57 does not permit multiple shortcuts for the same message to be associated with a single folder. Rather, each shortcut associated with a message must appear in a separate folder.

The fields of shortcut table 57 are as follows:

| | |
|---|---|
| MessageId | A non-zero value that uniquely identifies a row in the MessageSummary table. |
| AttachId | A value that uniquely identifies an AttachSummary within a MessageSummary. AttachId is set to zero if the shortcut is not associated with an AttachSummary. |
| FolderId | A non-zero value that uniquely identifies a row in folder table 56. |
| SortKey | A binary-comparable sort key. This field is described in detail below. |
| SortColumn | The FolderSortColumn (from folder table 56) used to construct the SortKey. Values are the same as FolderSortColumn. |
| SortDirection | The FolderSortDirection (from folder table 56) used to construct the SortKey. Values are the same as FolderSortDirection. |
| TriggerAction | Identifies the action to be taken when the TriggerDateTime is reached for a shortcut. Values may include, for example, taNone - to signify that no action should be taken, and taDeleteShortcut-to signify that the shortcut should be deleted when the time specified by TriggerDateTime has been reached. The design can easily be extended to support other actions. For example, as will be readily apparent to persons skilled in the art, timed shortcuts are a powerful general purpose mechanism that could be applied in many applications within a messaging environment (e.g., setting one or more reminders for a message). |
| TriggerDateTime | The date/time that the action defined in TriggerAction should be executed. A value of zero indicates that no timed action is to be executed for the shortcut. This field may, for example, contain an unsigned 32 bit value that is calculated by multiplying the number of days since Jan. 1, 1980 by 131,072 and then adding the number of seconds since midnight. This permits an action to be triggered at a time specified within a one second resolution. |
| IsUnread | Matches the IsUnread value from the associated MessageSummary. |
| IsCorresp | Matches the IsCorresp value from the associated MessageSummary. |
| IsUserShortcut | Indicates whether the shortcut was created by the user. This permits such shortcuts to be distinguished from automatically created shortcuts. In the preferred embodiment of the invention, user created shortcuts are not deleted when processing automatic organization rules for a message. |

MessageSummary table 52 contains a summary of information about messages and may act as a link to the underlying message objects in message store 23. The PrimaryKey for MessageSummary table 52 is MessageId. This key uniquely identifies a MessageSummary row. A first reason for implementing a MessageSummary table that is distinct from Message table 54 is that having a separate MessageSummary table 52 facilitates linking to messages in an external message store 23. A second reason is to enhance processing performance—a MessageSummary record (i.e. a row in MessageSummary table 52) is typically much smaller than its related message record (i.e. a row in Message table 54) and it is consequently much faster to read MessageSummary records than it is to read Message records. The actual contents of the MessageSummary will vary depending upon the particulars of the implementation, but in a currently preferred embodiment of the invention MessageSummary table 52 includes the following fields:

| | |
|---|---|
| MessageId | A non-zero value that uniquely identifies a row in MessageSummary table 52. |
| FolderExcludeList | (Array of [FolderId + FolderDateTime]) - Identifies the Folders from which shortcuts, that would normally be created by automatic rules, should be removed. |
| IsUnread | Indicates whether the message is in an unread state. |
| IsCorresp | Indicates whether the message is correspondence from or to a recognized correspondent. The logic to set this value is described below. |
| MessageDateTime | The date and time to be displayed to the user when listing messages in a folder. For unsent messages this contains the creation date/time, for received messages this contains the receive date/time, and for sent message this contains the send date/time. |
| DisplayNames | The sender or recipient names to be displayed to the user when listing messages in a folder. For received messages this contains the sender's name, and for sent or unsent messages this contains is the names of the primary recipients. |
| Subject | The subject of the message. |

AttachSummary table 53 contains a summary of Attachment information, and may act as a link to the underlying attachment objects in message store 23. The PrimaryKey for the AttachSummary table 53 is MessageId+AttachId. This key uniquely identifies a row in AttachSummary table 53. A first reason for implementing an AttachSummary table 53 that is distinct from Attachment table 55 is to facilitate establishing links to attachments 36A in an external message store 23. A second reason is to enhance processing performance—an AttachSummary record is typically much smaller than its related attachment record and it is consequently much faster to read AttachSummary records than attachment records. The actual contents of the AttachSummary will vary depending upon the particulars of the implementation, but in a currently preferred embodiment, AttachSummary table 53 has the following fields:

| | |
|---|---|
| MessageId | A non-zero value that uniquely identifies a row in MessageSummary table 52. |
| AttachId | A non-zero value that uniquely identifies an AttachSummary within a MessageSummary. |
| AttachType | The type of the attachment for organizational purposes. For e-mail attachments this could be a file extension (e.g. "DOC", "EXE", "TIF", "HTML", "VSB") for a file-based attachment, or a string such as "Attached Messages" for an attached message. |
| AttachName | The display name of an attachment. For e-mail attachments this could be the filename of a file-based attachment, or the subject of an attached message. |
| AttachSize | The size of the attachment (may be expressed in bytes). |

FIG. 9 shows the incoming events and incoming requests processed by catalog server 29, outgoing requests made by catalog server 29, and outgoing events generated by catalog server 29. For clarity, interactions between message client 27 and other components are not shown. Message client 27 will typically generate requests in response to user input such as requests to message store server 24 to add, change or delete a message.

Catalog server 29 handles the incoming requests listed in Table I. If any Request cannot be processed as described, the ResultCode is set to indicate the error that occurred. The Requests listed in Table I are sufficient to implement a working catalog server 29. It will be apparent to persons skilled in the art that additional requests could be implemented to improve ease of use.

TABLE I

INCOMING REQUESTS TO CATALOG SERVER

| Incoming Request | Processing | Reply |
|---|---|---|
| AddFolder<br>= ParentFolderId<br>+ <Folder properties> | • Read parent folder from catalog database 28;<br>• Build a new folder using <Folder properties>;<br>• Add the folder to catalog database 28;<br>• Generate FolderAdded event<br>• Build reply. | = ResultCode |
| ChangeFolder<br>= FolderId<br>+ <Folder properties> | • Read Folder from catalog database 28;<br>• Modify folder using <Folder properties>;<br>• Update folder in catalog database 28;<br>• Generate FolderChanged event;<br>• If IsHot has been modified, generate a FolderHotChanged event;<br>• Build reply. | = ResultCode |
| DeleteFolder<br>= FolderId | • Read folder from catalog database 28;<br>• Verify that folder has no child folders;<br>• Verify that folder contains no shortcuts; | = ResultCode |

TABLE I-continued

INCOMING REQUESTS TO CATALOG SERVER

Figure 10A:
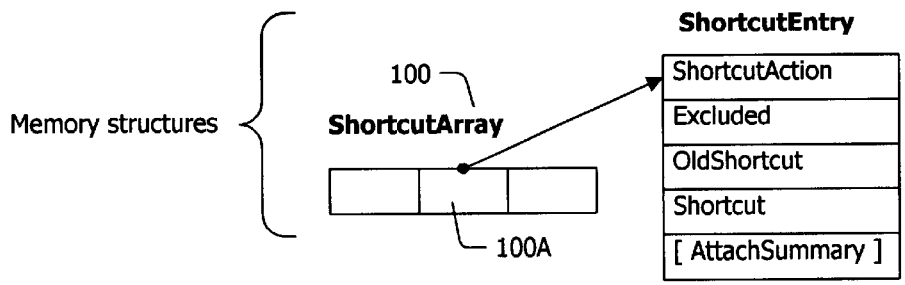
FIGS. 10A through 10D show how all shortcuts for a message can be added, changed or deleted in response to a MessageAdded or a MessageChanged event from the message store server, and show memory structures used in this processing.
Figure 14:
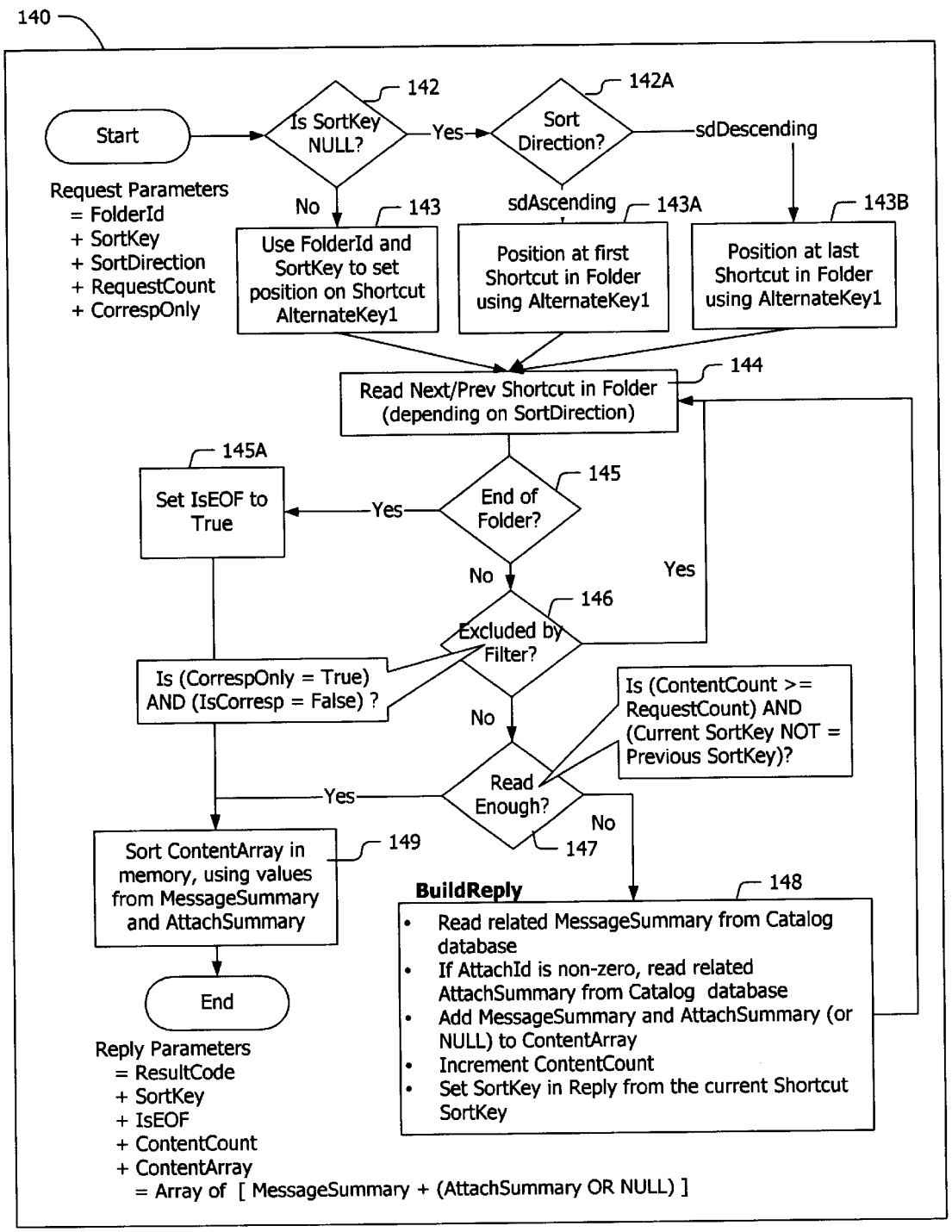
FIG. 14 is a flowchart that shows a method that can be used for incrementally reading shortcuts for display to a user.
Figure 15:
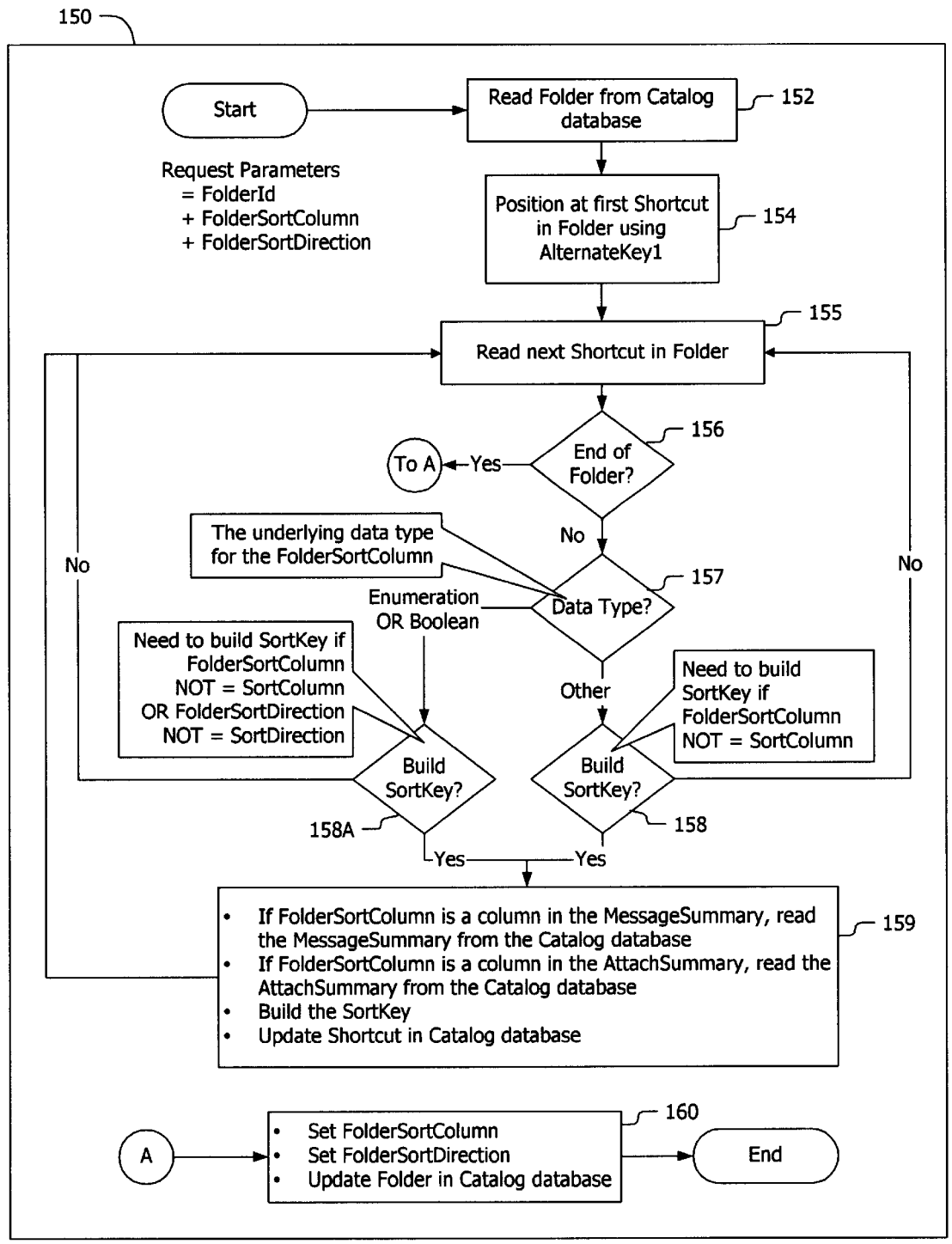
FIG. 15 is a flowchart that shows a method that can be used to change the SortKey for a folder and for all the shortcuts in the folder.

| Incoming Request | Processing | Reply |
|---|---|---|
| | • Delete folder from catalog database 28;<br>• Generate FolderDeleted event;<br>• Build reply. | |
| ReadFolder<br>= FolderId | • Read folder from catalog database 28;<br>• Build reply. | = ResultCode<br>+ Folder |
| ReadFolderSubtree<br>= ParentFolderId | • Read all folders from catalog database 28 with matching ParentFolderId (using AlternateKey1);<br>• Build reply. | =ResultCode<br>+ FolderCount<br>+ Array of Folder |
| ReadHotFolders | • Read all folders from catalog database 28 with IsHot = True (using AlternateKey3);<br>• Build reply. | ResultCode<br>+ FolderCount<br>+ Array of Folder |
| ReadFolderContents<br>FolderId<br>+ SortKey<br>+ SortDirection<br>+ RequestCount<br>+ CorrespOnly | • See FIG. 14 and description below;<br>• Build reply. | =ResultCode<br>+ SortKey<br>+ IsEOF<br>+ ContentCount<br>+ ContentArray<br>= Array of [MessageSummary + AttachSummary] |
| ChangeFolderSortKey<br>= FolderId<br>+ FolderSortColumn<br>+ FolderSortDirection | • See Figure 15 and description below;<br>• Build reply. | = ResultCode |
| AddShortcut<br>= FolderId<br>+ MessageId<br>+ AttachId | • Read shortcut from catalog database 28. If shortcut not found then:<br>- Read MessageSummary from catalog database 28;<br>- If AttachId is non-zero read AttachSummary from catalog database 28;<br>- Read folder from catalog database 28;<br>- Set IsUserShortcut to True;<br>- Empty ShortcutArray (FIG. 10A);<br>- Do "AddChangeShortcut" (FIG. 10C)<br>- Do "AddShortcut" (FIGS. 11A and 11B);<br>• Build Reply | = ResultCode |
| DeleteShortcut<br>= FolderId<br>+ MessageId<br>+ AttachId | • Read shortcut from catalog database 28. If shortcut not found then: Exit.<br>• If IsUserShortcut then<br>- Do "DecrementFolderCounts" (FIGS. 11A and 11B);<br>- Delete shortcut from catalog database 28;<br>- Generate ShortcutDeleted event;<br>- Do "UpdateFolder" (FIGS. 11A and 11B);<br>• If NOT IsUserShortcut<br>• then:<br>- Read MessageSummary from catalog database 28; | = ResultCode |

TABLE I-continued

INCOMING REQUESTS TO CATALOG SERVER

Figure 10B:
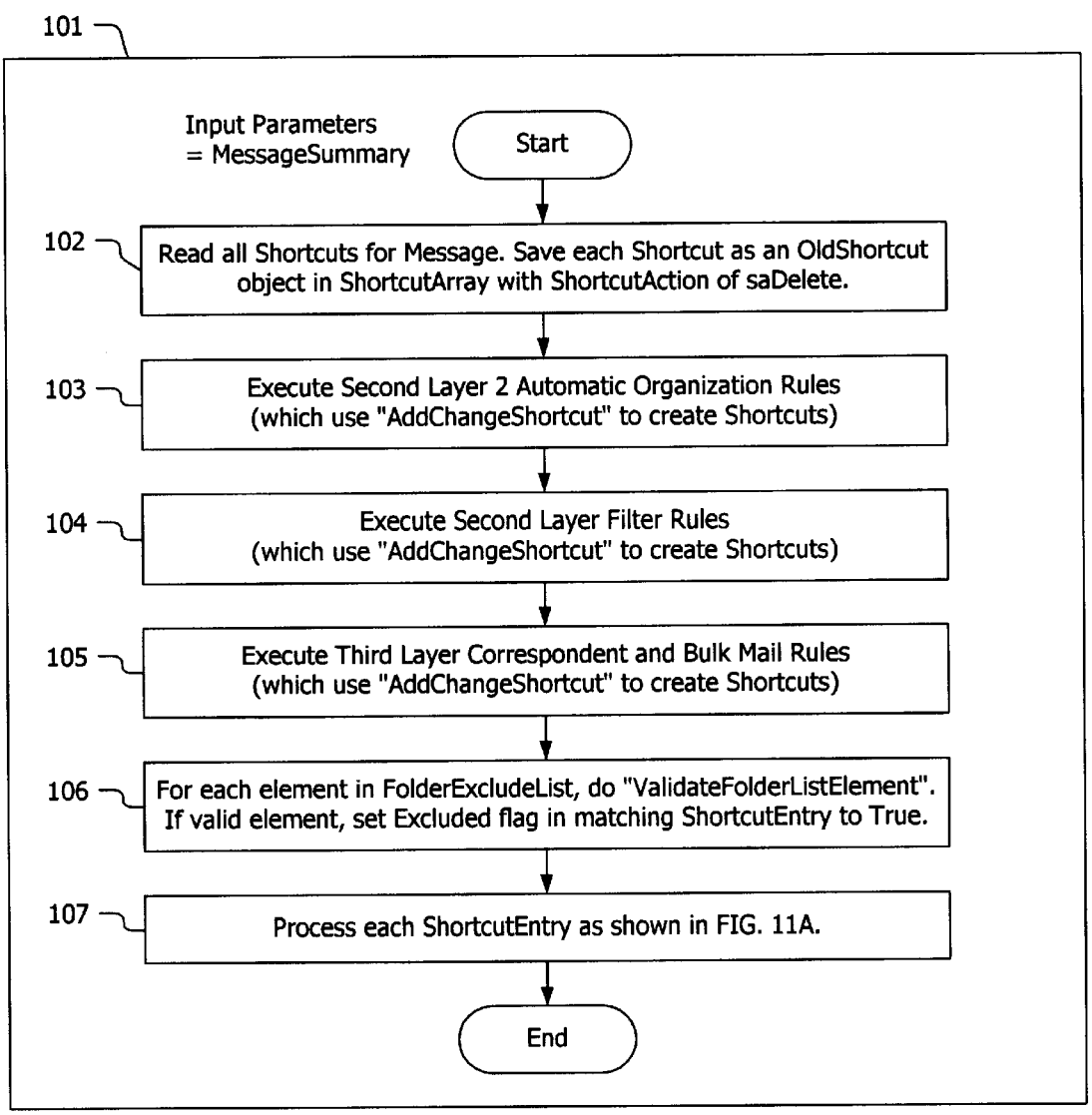
Figure 10C:
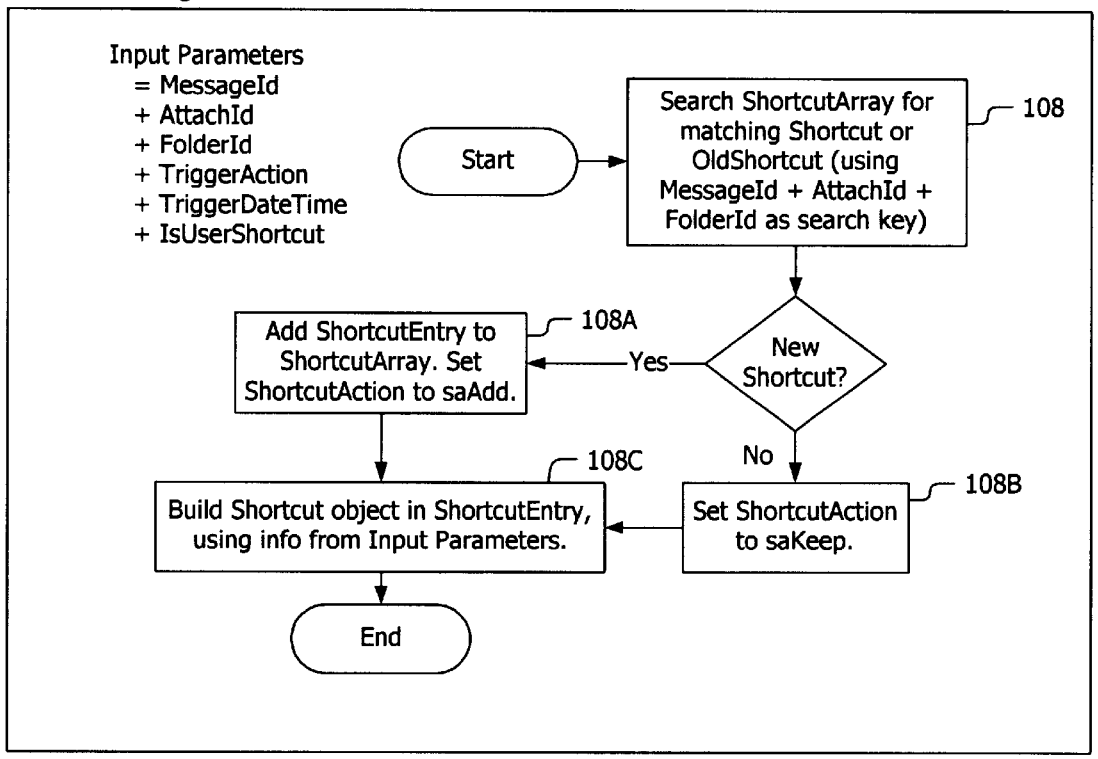

| Incoming Request | Processing | Reply |
|---|---|---|
| | - Add the FolderId and FolderDateTime to the FolderExcludeList;<br>- Update the MessageSummary in catalog database 28;<br>- Process shortcuts as shown in FIG. 10B;<br>• Build reply. | |
| DeleteFolder-Shortcuts<br>= FolderId | • Read folder from catalog database 28 and for each shortcut in the folder do:<br>- Read shortcut from catalog database 28;<br>- Do "DecrementFolderCounts" (FIGS. 11A and 11B);<br>- Delete shortcut from catalog database 28; and,<br>- Generate ShortcutDeleted event;<br>• Do "UpdateFolder" (FIGS. 11A and 11B);<br>• Build reply. | = ResultCode |
| ReadMessageSummary<br>= MessageId | • Read MessageSummary from catalog database 28;<br>• Build reply. | = ResultCode<br>+<br>MessageSummary |
| ReadAttachSummary<br>= MessageId<br>+ AttachId | • Read AttachSummary from catalog database 28;<br>• Build reply. | = ResultCode<br>+<br>AttachSummary |

Table II lists incoming events handled by catalog server 29.

TABLE II

EVENTS HANDLED BY CATALOG SERVER

| Incoming Event | Processing |
|---|---|
| MessageAdded<br>= StoreId<br>+ StoreMessageId | • Read message from message store server 24 (using a ReadMessage request);<br>• Build a new MessageSummary;<br>• Add the MessageSummary to catalog database 28;<br>• For each attachment in the message, build a new AttachSummary and add the AttachSummary to catalog database 28<br>Process shortcuts (FIG. 10B) |
| MessageChanged<br>= StoreId<br>+ StoreMessageId | • Read message from message store server 24 (using a ReafMessage request);<br>• Read the MessageSummary from catalog database 28 using the StoreId and StoreMessageId;<br>• Modify the MessageSummary to match the message;<br>• Update MessageSummary in catalog database 28;<br>• Delete all AttachSummaries for the message from catalog database 28;<br>• For each attachment in the message, build a new AttachSummary and add the AttachSummary to catalog database 28;<br>• Generate a SummaryChanged event;<br>• Process shortcuts (FIG. 10B) |
| MessageDeleted<br>= StoreId | • Read message from message store server 24 (using a ReafMessage request); |
| + StoreMessageId | • Read the MessageSummary from catalog database 28 using the StoreId and StoreMessageId;<br>• Delete the MessageSummary from catalog database 28;<br>• Delete all AttachSummaries for the message from catalog database 28;<br>• For each shortcut in the message do the following:<br>- Read related folder from catalog database 28;<br>- Do "DecrementFolderCounts" (FIGS. 11A and 11B);<br>- Delete shortcut from catalog database 28; and,<br>- Generate ShortcutDeleted Event;<br>Do "UpdateFolder" (FIGS. 11A and 11B) |

The only Outgoing Request that catalog server 29 must provide in the preferred embodiment of the invention is a ReadMessage request directed to message store server 24. The formatting of the request will vary depending on the message store server implementation, but for the purposes of this design it is assumed that the ReadMessage Request returns all messages and attachments requested by catalog server 29.

Catalog server 29 generates the events listed in Table III.

TABLE III

EVENTS GENERATED BY CATALOG SERVER

| Outgoing Event | Processing |
| --- | --- |
| FolderAdded<br>= Folder | Generated when a new folder is added to catalog database 28 so that message client 27 can add the folder to the user interface. |
| Folderchanged<br>= Folder | Generated when a folder is updated in catalog database 28 so that message client 27 can update the folder in the user interface. |
| FolderHotChanged<br>= Folder | Generated when the value of IsHot changes for a folder so that message client 27 can add or remove the folder from the "hot" view. |
| FolderDeleted<br>= Folder | Generated when a folder is deleted from catalog database 28 so that message client 27 can remove the folder from the user interface. |
| ShortcutAdded<br>= Shortcut | Generated when a shortcut is added to catalog database 28 so that message client 27 can add information about the related message or attachment to the user interface. |
| ShortcutDeleted<br>= Shortcut | Generated when a shortcut is deleted from catalog database 28 so that message client 27 can remove information about the related message or attachment from the user interface. |
| ShortcutSortKeyChanged<br>= Shortcut | Generated when the SortKey is changed for a shortcut (except when processing a ChangeFolderSortKey request) so that message client 27 can resequence information about the related message or attachment in the user interface. |
| SummaryChanged<br>= MessageSummary | Generated when a MessageSummary is changed in catalog database 28 so message client 27 can update information about the related message or attachment in the user interface. |

Those skilled in the art will understand from the foregoing description that shortcut table 57 plays a key role in associating messages with folders. The term "lightweight message shortcut" may be used to refer to the information in a row in shortcut table 57. A lightweight message shortcut may reside in the shortcut table and may also reside in a data structure in the catalog server 29 or the message client 27. A lightweight message shortcut may also be present in requests or events communicated between catalog server 29 and other software components.

The provision and use of lightweight message shortcuts (which are called simply shortcuts in this specification) is a key aspect of this invention. The following design criteria should be satisfied in order to successfully use lightweight message shortcuts. Significant deviation from these criteria can result in unacceptable performance or functionality:

lightweight message shortcuts must be very small in size, preferably less than 64 Bytes and most preferably less than 32 Bytes (in the currently preferred embodiment of the invention, shortcuts are 24 Bytes);

shortcut table 57 should have no more alternate keys than are necessary (in the preferred embodiment of the invention the shortcut table has two alternate keys);

shortcut table 57 should support sorting message summaries by any desired SortColumn;

shortcut table 57 should support incremental reading, so that the entire contents of a folder do not have to be read before they can be displayed to the user; and, shortcut table 57 should have full referential integrity with Folder table 56, MessageSummary table 52 and AttachSummary table 53, so that an action taken on a message or an attachment through a shortcut in one folder 38 will be visible in all folders 38 in which shortcuts to the same message exist.

Preferably the total number of shortcuts in a folder and the number of unread shortcuts in a folder is be available at all times for display in the user interface. This information can be displayed so that a user can look at a list of folders and see how many unread messages are in each folder.

FIGS. 10A through 10D, 11A and 11B illustrate a process by which lightweight message shortcuts corresponding to a message can be added, updated or deleted. The process makes use of a memory-based ShortcutArray 100 which contains ShortcutEntries 100A. Each ShortcutEntry 100A contains the following:

ShortcutAction—possible values are (saAdd—indicating that the shortcut should be added to catalog database 28, saDelete—indicating that the shortcut should be deleted from catalog database 28, saKeep—indicating that the shortcut should be retained unaltered in catalog database 28);

Excluded—which indicates whether or not the shortcut is a user-defined shortcut that should be excluded from being deleted by automatically executing shortcut handling rules;

OldShortcut;

Shortcut; and,

AttachSummary (needs to be present only if the shortcut is for an attachment and ShortcutAction is saAdd or saKeep).

FIG. 10B shows a method 101, which may be performed periodically, for automatically creating a group of shortcuts associated with a message. Method 101 begins by reading all existing shortcuts for a message into a ShortcutArray 100 (as OldShortcut objects) and setting the ShortcutAction to saDelete for each ShortcutEntry 100A (step 102). Method 101 continues (step 103) by applying organizational rules (as described below) to generate a set of new shortcuts for the message. The new shortcuts are saved as Shortcut objects in ShortcutEntrys 100A in ShortcutArray 100. Base layer 72 provides an "AddChangeShortcut" method (see FIG. 10C). This method is used to process each shortcut in the set of new shortcuts.

The "AddChangeShortcut" method searches the Shortcut Array to determine whether the shortcut being created or changed already exists (step 108). The method either creates a new ShortcutEntry and sets ShortcutAction to saAdd(step 108A) or updates an existing ShortcutEntry and sets ShortcutAction to saKeep (step 108B) depending on whether the shortcut is new with respect to the prior contents of the ShortcutArray or already exists in the ShortcutArray. Finally a ShortcutEntry is built and added to the ShortcutArray (step 108C).

Preferred embodiments of the invention apply filter rules (step 104) and correspondent and bulk mail rules (step 105) as described below.

Figure 10D:
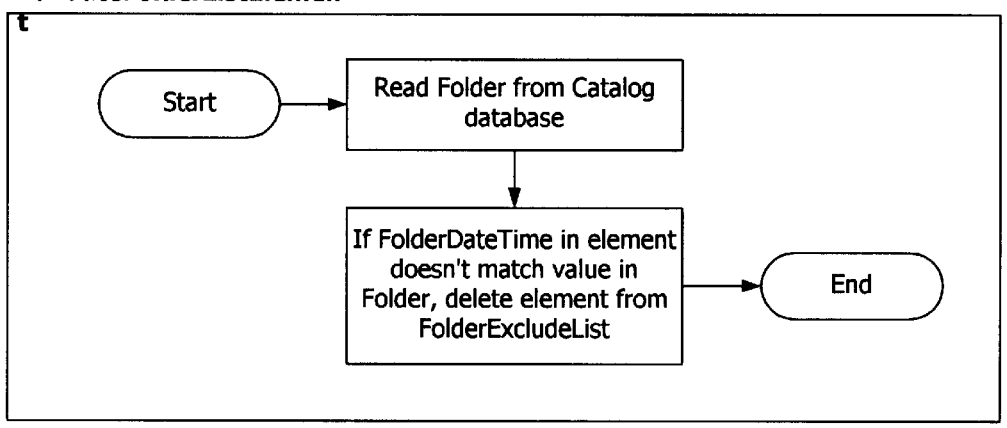

Preferred embodiments of the invention also include a FolderExcludeList which contains a list of folders in which shortcuts should not be automatically added. Method 101 processes the FolderExcludeList (step 106). Processing the FolderExcludeList preferably includes validating each element in the FolderExcludeList to make sure that the folder to which it refers has not been deleted and another folder with the same FolderId has been subsequently created. This validation may be done, for example, as shown in figure 10D by reading the folder from catalog database 28 and comparing the FolderDateTime in the FolderExcludeList element with the FolderDateTime for the folder. If a folder listed in an element of the FolderExcludeList is not found in catalog database 28 or the FolderDateTime values are different, then the element contains an invalid reference and is deleted from the FolderExcludeList. For each valid element, the Excluded flag is set to True in the matching ShortcutEntry (if a matching ShortcutEntry exists).

Figure 11A:
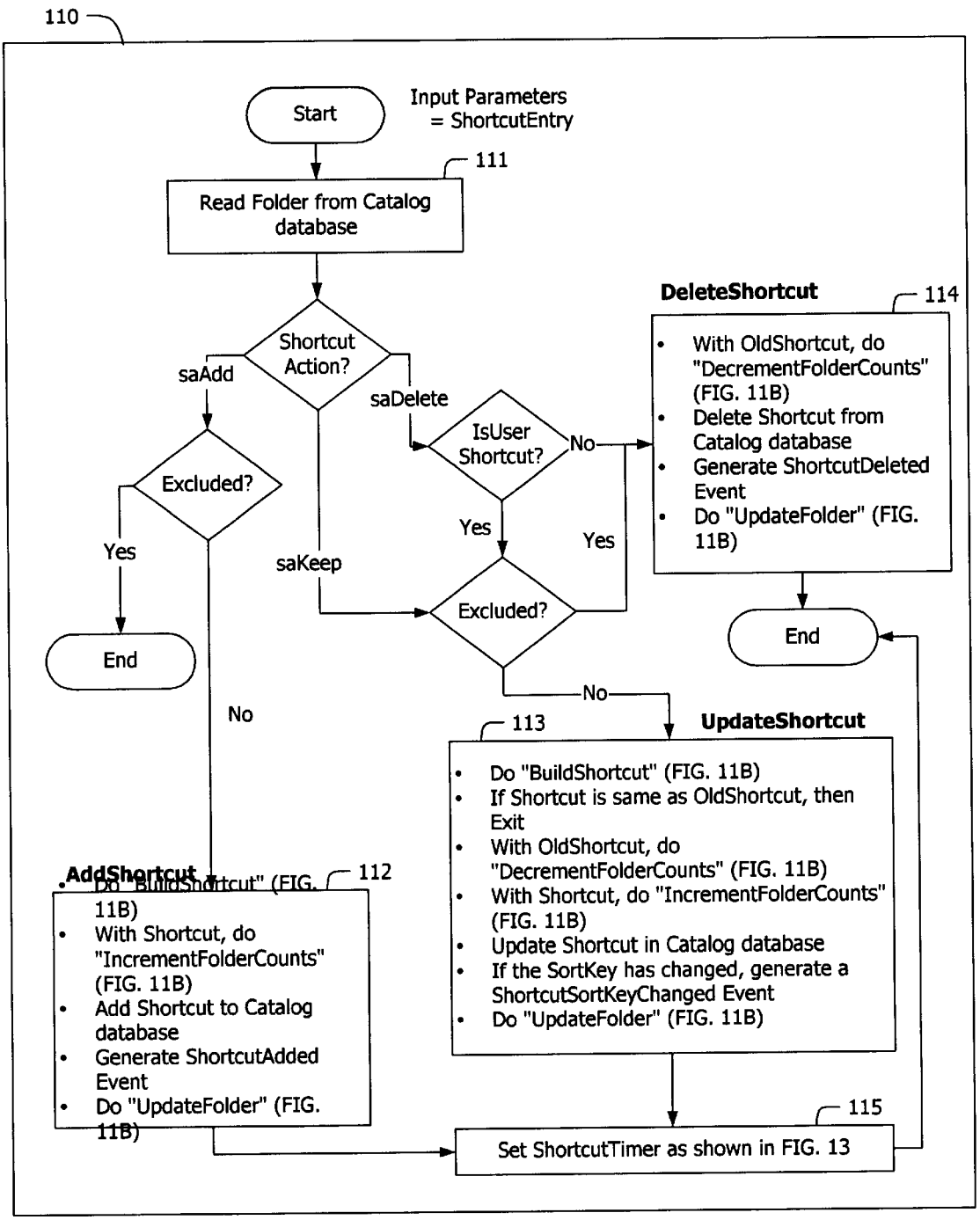

Method 101 concludes by processing each ShortcutEntry in the ShortcutArray and adding, updating or deleting the corresponding shortcut in catalog database 28 depending on the values of ShortcutAction, IsUserShortcut and Excluded. A method 110 which may be used for processing ShortcutEntries is shown in FIGS. 11A and 11B (step 107). During step 107 the folder counts are incremented or decremented as appropriate. For each Shortcut added, changed, or deleted, the ShortcutCount—which indicates a total number of shortcuts in a folder, UnreadCount—which indicates a total number of shortcuts which have the status unread, CorrespShortcutCount—which indicates a total number of shortcuts which relate to messages to or from a recognized correspondent, and CorrespUnreadCount—which indicates a total number of shortcuts which relate to messages to or from a recognized correspondent and which have a status of unread, are correctly updated for the folder with which the shortcut is associated. ShortcutAdded, ShortcutDeleted, ShortcutSortKeyChanged and FolderChanged events are generated as required.

The net result of method 101 is that, with the exception of shortcuts excluded from consideration because they are listed on the FolderExcludeList, only shortcuts created by the organizational rules and shortcuts created by the user exist in catalog database 28 for the message being processed.

Method 110 reads the folder corresponding to the ShortcutEntry from catalog 28 and, depending upon the value of ShortcutAction, whether or not the shortcut is excluded and whether or not the shortcut is a user shortcut, method 110 either adds a shortcut corresponding to the ShortcutEntry (step 112), updates a shortcut corresponding to the ShortcutEntry (step 113) or deletes a shortcut corresponding to the ShortcutEntry (step 114). If a shortcut is added or updated then method 110 also sets the shortcut timer to the earliest TriggerDateTime for any shortcut in catalog 28 (step 115).

FIG. 12 illustrates the structure of shortcuts in a currently preferred embodiment of the invention. The size of the Shortcut is minimized by using a 6 byte SortKey and by encoding TriggerDateTime as a 32 bit unsigned integer. The number of alternate keys is minimized. In the preferred embodiment this is done by:

Ordering the fields in the PrimaryKey so that it can be used both as a primary key, as well as a foreign key to associate shortcuts with a message or an attachment;

Using AlternateKey1 to incrementally read shortcuts within a folder, as well as a ForeignKey to associate shortcuts with a folder; and, Populating AlternateKey2 only if TriggerDateTime is non-zero.

A feature of preferred embodiments of the invention is that the shortcuts include a sort key (SortKey) which is variable and is dynamically rewritten to accommodate sorting on a particular criterion. In the preferred embodiment each folder has FolderSortColumn and FolderSortDirection properties which specify a criterion for use in sorting. The SortKey is written to match the SortColumn and SortDirection of the folder. A sort key is constructed by a software component which takes as input parameters a folder object, a MessageSummary object, and an AttachSummary object (the AttachSummary object is needed only if creating a Attachment Shortcut, otherwise it can be NULL). The SortKey is constructed by determining which MessageSummary or AttachSummary field to use for sorting (based on a value in the FolderSortColumn). The software component identifies a format for the field and selects a corresponding format for the SortKey. If the field type is Enumeration or Boolean, then the SortKey format is also dependent upon whether FolderSortDirection has a value of sdAscending or sdDescending.

The SortKey is initialized, for example by setting all of its characters to binary zeros. The shortcut SortColumn is set to FolderSortColumn and the Shortcut SortDirection is set to FolderSortDirection. Then the format of the SortKey is set as follows:

For a field which contains a string of characters in Unicode format, UCW1, UCW2 and UCW3 are set to the Unicode character weights of the first three characters in the string;

For a field which contains a string of characters in ANSI format, C1, C2, C3, C4, CS, C6 are set to the values of the first 6 characters in the string. Alternatively, the ANSI string could be converted to a Unicode string and the SortKey generated as above.

For a DateTime field, YY is set to the year minus 1950, MM to the month number, DD to the day of the month, hh to the hour based on a 24 hour clock, mm to the minute, and ss to the second.

For an Enumeration or Boolean field where SortDirection is sdDescending, Value is set to the numeric equivalent of the Enumeration or Boolean value, and YY, MM, DD and hh are set as described for a Date/Time field.

For an Enumeration or Boolean field where SortDirection is sdAscending, Value is set to the numeric equivalent of the Enumeration or Boolean value, YY is set to 255 minus the year plus 1950, MM is set to 255 minus the month number, DD is set to 255 minus the day of the month, and hh is set to 255 minus the hour based on a 24 hour clock.

For a field which contains a 32-bit integer value (an Integer32 value), the first character is set to bits 31–24 of the field, the second character is set to bits 23–16 of the field, the third character is set to bits 15–8 of the field, and the fourth character is set to bits 7–0 of the field, where 0 is the least-significant bit and 31 is the most-significant bit. A SortKey for a field containing a 16-bit integer value (an Integer16 value) may be created by converting the Integer16 value to an Integer32 and following the steps above.

SortKey values for other field types can be constructed in a manner analogous to the examples above.

The end result of this SortKey encoding is a binary-comparable sort key that provides an approximate ordering of shortcuts within a folder. The ordering is only approximate because it only compares the SortKeys which contain only the most significant parts of the fields under consideration (for example, the first three letters of a unicode string). There will be cases where several shortcuts might have the same value for the SortKey even though the shortcuts have non-identical values in the column being sorted on. Encoding a partial DateTime value in the Enumeration or Boolean SortKey provides for more control breaks for incremental read processing than can be provided by the value of the field itself. In message client software it is also common practice, when sorting messages on a column other than MessageDateTime, to use MessageDateTime as a secondary sort key with most recent messages shown first—this is the rationale for using inverted YY, MM, DD and hh values in the ascending SortKey, and normal YY, MM, DD and hh values in the descending SortKey.

Preferred embodiments of the invention support timed shortcuts which cause the execution of an action (TriggerAction) when the system clock advances past a time specified in the TriggerDateTime field of the shortcut. The creator of the Shortcut is responsible for supplying the desired TriggerAction and TriggerDateTime. The action may be, for example, deleting the shortcut.

Figure 13:
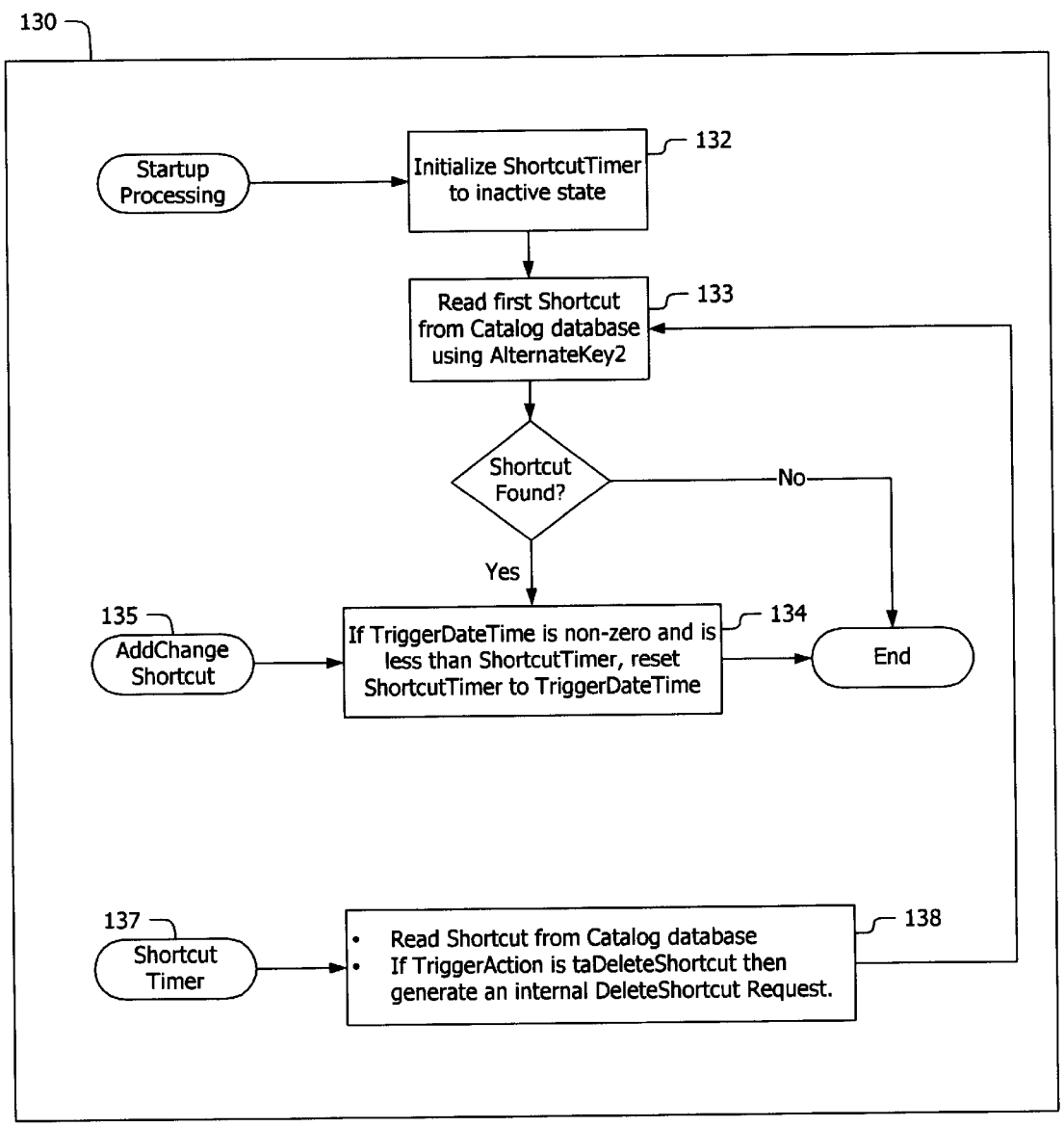
FIG. 13 is a flowchart that shows processing in a method that can be used to handle timed shortcuts.

As shown in FIG. 13, a method 130 for handling timed shortcuts maintains a shortcut timer. The shortcut timer may be a memory location containing a value equal to the earliest TriggerDateTime for the shortcuts under management which is compared periodically (preferably at least once per second) to the system clock of the computer 18 on which the system is operating. In preferred embodiments of the invention the shortcut timer is a software object which can contain a time value and includes software code which compares the time value to the system clock. A shortcut timer event is generated when the shortcut timer contains a value which indicates a time equal to or earlier than the current time as indicated by the system clock.

When the system is initialized, the shortcut timer is initialized to an inactive state (step 132). Then the first shortcut is read from catalog database 28 using AlternateKey2 of the shortcut table (step 133). This yields the shortcut from catalog database 28 which has the earliest TriggerDateTime value (since AlternateKey2= TriggerDateTime). If there is such a shortcut then the shortcut timer is set to the TriggerDateTime (step 134). If there is no such shortcut then method 130 stops.

Each time a new shortcut is added to catalog database 28 or a shortcut in catalog database 28 is changed an AddChangeShortcut event 135 occurs. In response to an AddChangeShortcut event 135 step 134 is repeated for the new shortcut. The result is that the shortcut timer always contains the earliest TriggerDateTime for any shortcut in catalog database 28. On the occurrence of a shortcut timer event 137 the system reads the shortcut from catalog database 28 and performs the specified TriggerAction (step 138). The system then executes method 130 starting at step 133 to set the shortcut timer for the next TriggerDateTime.

Preferred embodiments of this invention permit message client 27 to read the contents of a folder incrementally. This enhances performance because it permits the first few messages in the folder to be displayed to a user very quickly without requiring the user to wait until all of the messages in the folder have been read before seeing the first messages. Providing users with very quick access to messages associated with a folder is important for usability of the system.

When a user selects a folder by way of interface device 25, message client 27 receives the selection and generates a ReadFolderContents request directed to catalog server 29. As shown in FIG. 14, the ReadFolderContents identifies a folder and preferably includes a request count. The request count is a number which is preferably at least as large as a number of rows visible in panel 64. The initial ReadFolderContents request preferably specifies a NULL SortKey. In response to the ReadFolderContents request catalog server 29 performs method 140 of FIG. 14. The end result of method 140 is a reply which includes a sorted array which message client 27 can use to populate the list displayed in panel 64. The reply also contains a SortKey value which is used by message client 27 to build subsequent ReadFolderContents requests to retrieve the remaining shortcuts in a folder.

As a user uses interface 25 to scroll through the shortcuts to messages which are displayed in panel 64, message client 27 generates additional ReadFolderContents requests for catalog server 29. Message client 27 uses the SortKey provided by catalog server 29 with each reply to construct the subsequent ReadFolderContents request. This continues until the user stops scrolling or an IsEOF flag of True (which indicates that the last shortcut has been reached) is returned in a reply.

If the user has requested that the display of messages which are not associated with recognized correspondents be suppressed (for example, by clicking on tool button 68) then message client 27 sets a value CorrespOnly in the ReadFolderContent request to True.

Those skilled in the art will understand that message client 27 may have a conventional architecture (although it is not so limited) with some minor modifications to facilitate incremental reading. For incremental reading as described herein a message client 27 should be adapted to behave as follows:

for each folder, message client 27 should save the SortKey and the IsEOF flag from the most recent ReadFolderContents reply for that folder. These values can be used to read the next group of shortcuts for that folder.

when message client 27 receives a ShortcutAdded Event for a folder, it should discard the event if the saved IsEOF flag is False and the event SortKey is greater than the saved SortKey (i.e. the event relates to a shortcut that would not yet have been requested by message client 27 for display even if it had been received earlier).

when message client 27 receives a SummarySortKeyChanged event it should reposition the corresponding entry in the list being displayed in panel 64 to match the new sort sequence. If the saved IsEOF flag is False and the event's SortKey is greater than the saved SortKey, then message client 27 should refresh its display by issuing ReadFolderContents requests until it receives a reply having a IsEOF value of True, or the a reply having a SortKey value greater than the saved SortKey.

Method 140 begins by testing to determine whether the ReadFolderContents request is an initial request or is a request to read more shortcuts (step 142). In the preferred embodiment of the invention this is done by testing to see if the SortKey supplied with the ReadFolderContent request is NULL. If the request is an initial request then the sort direction is checked (step 142A). After these initial steps the position in the Shortcut table 82 is established using the FolderId, SortKey and SortDirection from the request. If step 142 determines that the request is not an initial request then the SortKey from the request is used to set a position on AlternateKey1 for shortcut table 57 (step 143). Otherwise, depending upon the sort direction determined in step 142A AlternateKey1 for shortcut table 57 is used to position for retrieval beginning at either the first shortcut (step 143A) or the last shortcut (step 143B) in the folder.

Method 140 continues by reading shortcuts (step 144) in either ascending or descending sequence until the end of folder is reached or a sufficient number of shortcuts has been read. In the illustrated embodiment, this is performed by, after attempting to read the next shortcut in step 144 determining if the end of the folder has been reached (step 145). If so then the end of folder flag (IsEOF) is set to true and the method concludes. If not then the retrieved shortcut is tested to see if it is excluded from view by any current filter (step 146). For example, if the shortcut is not associated with a recognized correspondent (in the currently preferred embodiment this is indicated by setting the IsCorrespondent field in the shortcut to contain a value of False) and CorrespOnly is True, then the shortcut is discarded. If this happens then the method repeats step 144 to retrieve the next shortcut. Each time another shortcut which matches any applicable filter criteria has been read then method 140 tests to see whether enough shortcuts have been read (step 147).

Step 147 causes method 140 to keep reading shortcuts until either—all of the shortcuts in the folder have been read—or—at least the number of shortcuts specified by the request count have been retrieved and the most recently retrieved shortcut has a SortKey different from the SortKey of the previous shortcut. Each time another shortcut is read, if enough shortcuts have not been read, method 140 adds the most recently read shortcut to a reply data structure (step 148). The reply data structure is preferably located in memory so that it can be rapidly sorted. When enough shortcuts have been retrieved then method 140 sorts the shortcuts in the reply data structure and sends the sorted results to message client 27 in a reply (step 149). Sorting the reply data structure in memory corrects for the approximate ordering of shortcuts in AlternateKey1 of shortcut table 57 that can result from truncated values in the SortKey field.

One skilled in the art will readily understand that method 140 may be optimized to take advantage of efficiencies which may be obtained by reading multiple shortcuts in single database query. When this is done, the FolderId, SortKey and SortDirection are still provided in the request and used to establish a starting position in shortcut table 82. This permits method 140 to support reading in either ascending or descending sequence. Even if catalog server 29 reads multiple shortcuts from catalog database 28 in one operation, method 140 still does a partial read of the shortcuts in a folder, and generates a reply only when "enough" shortcuts have been read, as described above.

As described above, the SortKey in shortcut table 57 is used to retrieve shortcuts, in approximate order, from catalog database 28. To retrieve shortcuts based upon a different sort criterion (e.g. to sort the current folder based upon values in a different column) it is usually necessary to change the value for the SortKey. A typical message client 27 permits a user to select a column and direction in which messages will be sequenced when they are displayed in panel 64. If the user is simply sorting the current column in reverse order and the column is of a type which uses the same SortKey for sorting in both ascending and descending order (e.g.—of the examples given above the current column does not hold an enumeration or binary value) message client 27 can send a ReadFolderContents Request to catalog server 29 with the appropriate value for FolderSortDirection and with SortKey initialized (e.g. set to NULL). Catalog server 29 will then read the folder contents from the beginning or the end of the folder identified in the ReadFolderContents request as requested.

However, if the user changes the sort direction of a column which uses different SortKey values for sorting in ascending and descending orders (for example, a column which contains enumeration or binary values) or if the user selects a different column to sort on (for example by clicking on a header 65 or otherwise selecting a column using user interface device 25) then the SortKey value for each shortcut in the folder will need to be rewritten before the shortcuts in the folder can be read and sorted as described above with reference to FIG. 14. As an alternative to writing new SortKey values first and then reading the shortcuts according to a method like that of FIG. 14, the system could read all of the shortcuts in the folder into memory and sort them in memory on the basis of the values in the sort column for the folder (thereby avoiding the need to use the SortKey for sorting). Message client 27 may include logic to decide whether or not to defer updating the SortKey when a user signals a desire to sort on the basis of a new column. If message client 27 decides to defer processing the SortKeys, then it will typically generate and send to the catalog server a ChangeFolderSortKey request in response to the user selecting a new folder to view. Deferred processing typically has better performance characteristics when message client 27 and catalog server 29 are on the same computer, but its ability to process a large folder is limited by the amount of available memory in the computer. Immediate processing to change SortKey values typically has better performance characteristics when the message client 27 and catalog server 29 are on separate computers.

FIG. 15 illustrates a method 150 performed by catalog server 29 for updating the SortKey values for shortcuts associated with a folder. In the currently preferred embodiment of the invention method 150 is invoked by a ChangeFolderSortKey request from message client 27. Method 150 iterates through all shortcuts in the folder identified in the ChangeFolderSortKey request and updates the SortKey for each of the shortcuts. While implementing method 150, catalog server 29 first reads data about the folder from catalog database 28 (step 152) and positions itself so that the next shortcut for reading is the first shortcut in the folder (for example by using AlternateKey1) (step 154). Then catalog server 29 reads the next shortcut in the folder (step 155) and tests to see whether the end of the folder has been reached (step 156). If there is no next shortcut (i.e. the end of the folder has been reached) then method 150 proceeds to step 160 which updates the folder data in catalog database 28.

Where the end of the folder has not been reached then catalog server 29 tests to determine the data type of the current FolderSortColumn (step 157). Depending upon whether or not the data type requires a new SortKey when the sort direction is changed, method 150 proceeds to steps 158 or 158A in which catalog server 29 tests to determine whether a new SortKey is needed. Steps 158 and 158A deal with the situation where a SortKey for a shortcut is updated to a value which is greater than the original SortKey. Such shortcuts will be read a second time during the iteration. The shortcut is only updated once, however because the shortcut's SortColumn and SortDirection are now the same as the folder's FolderSortColumn and FolderSortDirection. If step 158 or 158A determines that a shortcut's SortKey should be updated then method 150 proceeds to step 159 in which new SortKey, SortColumn and SortDirection values are written to the shortcut in catalog database 28.

As mentioned earlier, the design and construction techniques for making a message client suitable for use in this invention are well known in the art. This knowledge includes the generation of requests to message store server 24 and catalog server 29 in response to user interactions, and the handling of the replies that are returned for each request. The knowledge also includes the processing of events generated by message store server 24 and catalog server 29 in order to update the user interface to communicate the underlying changes in message store 23 and catalog database 28 to the user.

The foregoing description provides a basic framework for the construction of systems and methods which permit shortcuts corresponding to messages to be created and associated together in folders. A single message may have associated with it a great many shortcuts. The shortcuts can be associated into folders in such a manner that a user has many different ways to view a set of messages. In preferred embodiments of the invention shortcuts for messages are generated automatically. This can be viewed conceptually as a higher level function provided by second layer 74 (FIG. 7).

Second layer 74 provides services which automatically organize shortcuts to messages into multiple folders based upon the attributes of the messages. Second layer 74 can also be used to provide enhanced filtering of messages and to provide enhanced manual organization of messages.

Figure 16:
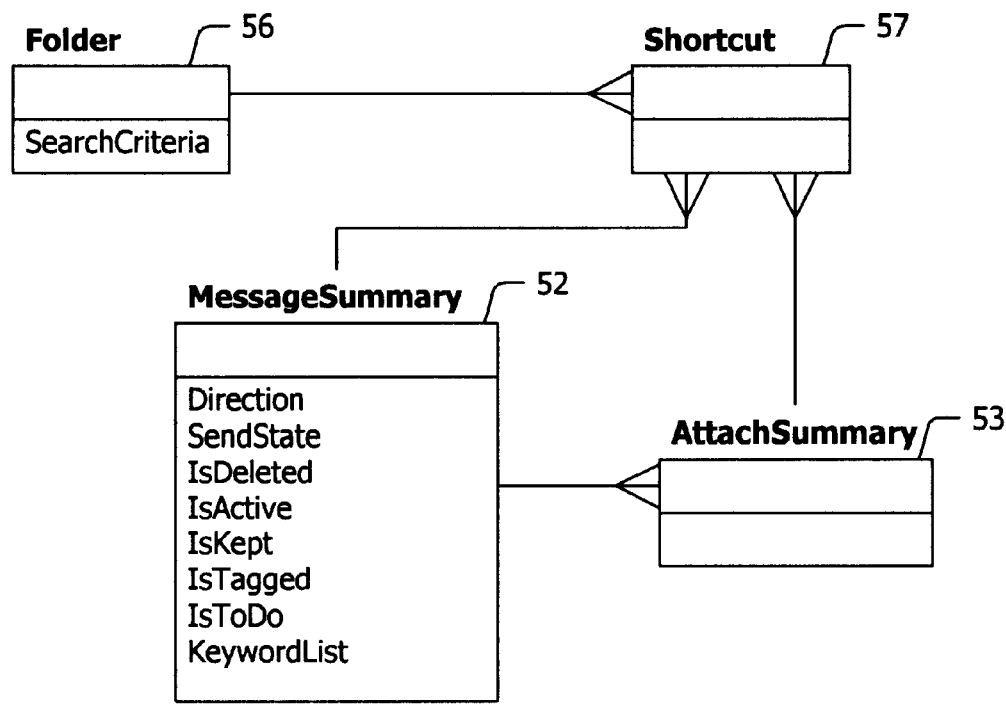
FIG. 16 is an entity-relationship diagram of the catalog database of FIG. 8, showing additional elements that can be used to support a second layer of functionality.

Implementing second layer 74 may involve adding certain fields to tables within catalog database 28. FIG. 16 shows one possible set of added fields for implementing second layer 74. A SearchCriteria field in folder table 56 contains search criteria that are encoded as a stream, and which can be decoded as required.

Several fields are added to MessageSummary table 52 as follows:

Direction identifies the direction of the message. Values are (drSend, drReceive).

SendState indicates the state of an outgoing message. Values are (ssUnsent, ssWaitingSend, ssSent).

IsDeleted indicates whether a message has been logically deleted.

IsActive indicates whether a message is in an active state. When a message is added to catalog database 28 IsActive is initially set to True.

IsKept indicates whether message deletion is to be prevented.

IsTagged indicates whether the message is marked with a tag (or a flag).

IsToDo indicates whether a follow-up action is required for the message.

KeywordList is an array of keywords, encoded so that each keyword can be extracted separately.

When catalog 28 is created it may be populated with an initial set of folders. An example of a possible initial set of folders is the set of folders shown in FIG. 17 which are not marked with asterisks. Folders in FIG. 17 which are marked with asterisks are typically created subsequently as they are required. Alternate embodiments of the invention could have different initial sets of and arrangements of folders without departing from the invention. The Folders that are added when catalog database 28 is initialized may be termed "system folders". Table IV describes a set of rules according to which shortcuts are added to the second layer folders including the folders shown in FIG. 17. Each system folder preferably has a pre-assigned FolderId so that catalog server 29 can read any desired system folder simply by specifying its FolderId.

TABLE IV

RULES FOR SECOND LAYER FOLDERS

| Folder Description | Rules/Notes |
|---|---|
| A. Status Folders | |
| Deleted | Create shortcut in "Deleted" folder if IsDeleted is True. Create no other shortcuts for the message. |
| Active Mail | Create shortcut in "Active Mail" folder if IsActive is True. Note: The "Active Mail" folder is intended as a repository for messages which the user is actively dealing with. The processing for the MessageAdded event sets IsActive to True for each new message. If supported by message client 27, the user can manually set IsActive to False to remove the shortcut from this folder when he/she is finished dealing with an active message. |
| Drafts | Create shortcut in "Drafts" folder if Direction is drSend and SendState is ssUnsent. |
| Kept | Create shortcut in "Kept" folder if IsKept is True. Note: The IsKeep flag is designed to prevent the accidental deletion of messages, and requires the appropriate support from message client 27 and message store server 24. |
| Received | Create shortcut in "Received" folder if Direction is drReceive. |
| Sent | Create shortcut in "Sent" folder if Direction is drSend and SendState is ssSent. |
| Tagged | Create shortcut in "Tagged" folder if IsTagged is True. Note: The IsTagged flag is designed for the user to tag messages to which he/she wishes to pay special attention, and requires the appropriate support from message client 27 and message store server 24. |
| To Do | Create shortcut in "To Do" folder if IsToDo is True. Note: The IsToDo flag is designed for the user to identify messages on which he/she needs to take follow up action, and requires the appropriate support from message client 27 and message store server 24. |
| Unread | Create shortcut in "unread" folder if IsUnread is True. |
| Waiting Send | Create shortcut in "Waiting Send" folder if Direction is drSend and SendState is ssWaitingSend |
| B. Date Folders | |
| Today | Create Timed Shortcut in "Today" folder if MessageDateTime is within the current day. The shortcut expires at midnight of the current day. |
| Yesterday | Create timed shortcut in "yesterday" Folder if MessageDateTime is within the previous day. The shortcut expires at midnight of the current day. |
| This Week | Create timed shortcut in "This Week" folder if MessageDateTime is within the current week. The shortcut expires at the end of the current week. |
| Last Week | Create timed shortcut in "Last Week" folder if MessageDateTime is within the previous week. The shortcut expires at the end of the current week. |
| <Month Folder> | Convert MessageDateTime to a display date that contains just year and month (e.g. "1999 Nov"). Use the display date to read within the "Date" subtree of the folder table using AlternateKey2. If a folder is not found, then create a folder within the "Date" subtree with a FolderName of the display date. Create a shortcut in the folder. |

TABLE IV-continued

RULES FOR SECOND LAYER FOLDERS

| Folder Description | Rules/Notes |
|---|---|
| C. Attachment Folders | |
| All Attachments | Create a shortcut in the "All Attachments" folder for each AttachSummary in the message. Note that the AttachSummary needs to be saved in the ShortcutEntry for use when building the Shortcut SortKey. |
| <Attachment Type Folder> | For each AttachSummary in the message, use the AttachType to read within the "Attachment" subtree of the Folder table using AlternateKey2. If a folder is not found, then create a folder within the "Attachment" subtree with a FolderName of the AttachType. Create a shortcut in the folder. Note that the AttachSummary needs to be saved in the ShortcutEntry for use when building the Shortcut SortKey. |
| D. Keyword Folders | |
| <Keyword Folder> | For each Keyword in the KeywordList, use the Keyword to read within the "Keyword" subtree of the folder table using AlternateKey2. If a folder is not found, then create a folder within the "Keyword" subtree with a FolderName of the Keyword. Create a shortcut in the Folder. |

Preferred embodiments of this invention automatically organize messages into multiple folders without any user intervention. The organization may be based either on native properties of the message (e.g. MessageDateTime) or on properties over which the user has control (e.g. Keywords which the user assigns to a message), or both. Catalog server 29 may apply automatic organization rules when processing shortcuts for a message as shown in step 103 of FIG. 10B. When the rules state that new shortcuts should be created, catalog server 29 uses the "AddChangeShortcut" method (FIG. 10C) to create the new shortcuts. An example set of rules for creating shortcuts in the folders of FIG. 17 is provided in Table IV.

The invention can also provide message filtering using message filtering rules to determine folders into which a shortcut to a particular message should be, or should not be, put. Various systems for applying filtering rules to messages are known to those skilled in the art. Such systems may be used for applying filtering rules in this invention as well if modified to create shortcuts according to this invention instead of creating multiple separate copies of each message. The filter engine is invoked when processing shortcuts for a message as shown in step 104 of FIG. 10B. The filter engine may use the "AddChangeShortcut" method of FIG. 10C to create a shortcut in each desired folder.

Preferably user interface 25 permits a user to manually select a message and add shortcuts to the selected message to a folder of the user's choice. Such shortcuts can be created by generating an AddShortcut request in response to the user's input. Those skilled in the art will be able, in light of the foregoing disclosure, to create a message client which provides a suitable user interface for permitting users to manually create and manage folders, and to add or delete shortcuts from these folders. Message client 27 can generate and use AddFolder, ChangeFolder, DeleteFolder, AddShortcut and DeleteShortcut requests to cause shortcuts to be placed in user defined folders according to a user's input. In the currently preferred embodiment of the invention, user created folders created under a "User Folders" folder. All user created folders are thus placed in the "User Folders" subtree. Advantageously a user can manually organize the same message into multiple folders without making multiple copies of the message.

Preferred embodiments of the invention include a search engine, which may be, but is not necessarily, incorporated in catalog server 29 for searching catalog database 28 for messages which meet a user's search criteria. The search engine preferably creates shortcuts to messages which satisfy the search criteria and places the resulting shortcuts into a "saved search results" folder. The SearchCriteria field in the Folder table of catalog database 28 provides a place for the search engine to store the search criteria associated with the folder. The search engine can manipulate search results folders through the use of AddFolder, ChangeFolder, DeleteFolder, AddShortcut and DeleteFolderShortcuts requests. In the current embodiment these search results folders are automatically placed in a "Search Results" subtree beneath a system folder named "Search Results". The net result is the ability to create multiple search results folders each of which contains the results of a user initiated search as well as the information (SearchCriteria) needed to re-run the search upon demand (or periodically).

Preferred embodiments of the invention automatically recognize correspondents and make possible sophisticated organization of messages into folders defined for recognized correspondents. These functions are performed in third logical layer 76. Third layer 76 functions can also automatically separate "Bulk Mail" from other mail. Third layer 76 operates by associating addresses with folders, and then using this relationship to automatically create shortcuts, addresses and folders.

The preferred embodiment of the invention automatically creates a folder for each recognized correspondent. All messages received from the correspondent and all messages sent to the correspondent are visible in that correspondent folder. Preferably catalog server 29 does not immediately create a visible folder for every new correspondent that it identifies. In some cases a user will receive a message which has been sent to a large number of others in addition to the user. Catalog server 29 preferably creates a folder for every new correspondent that it identifies but permits a user to keep these folders hidden until an event or pattern of behaviour emerges which identifies the correspondent associated with the folder as being a recognized correspondent. Correspondents who have not yet become recognized correspondents may be termed "pending correspondents". Bulk mail is automatically made visible in the "Unsorted" folder.

The user is then able to impose their will upon this automatic organization by creating new bulk mail folders, by merging or separating correspondent folders, by merging or separating bulk mail folders, or by changing selected correspondent folders into bulk mail folders and vice versa. The final result is a highly organized set of correspondent and bulk mail folders that involved very little effort on the part of the user to create. New messages continue to be automatically organized into all the appropriate correspondent and bulk mail folders, and new correspondent folders continue to be created automatically as required.

Figure 18:
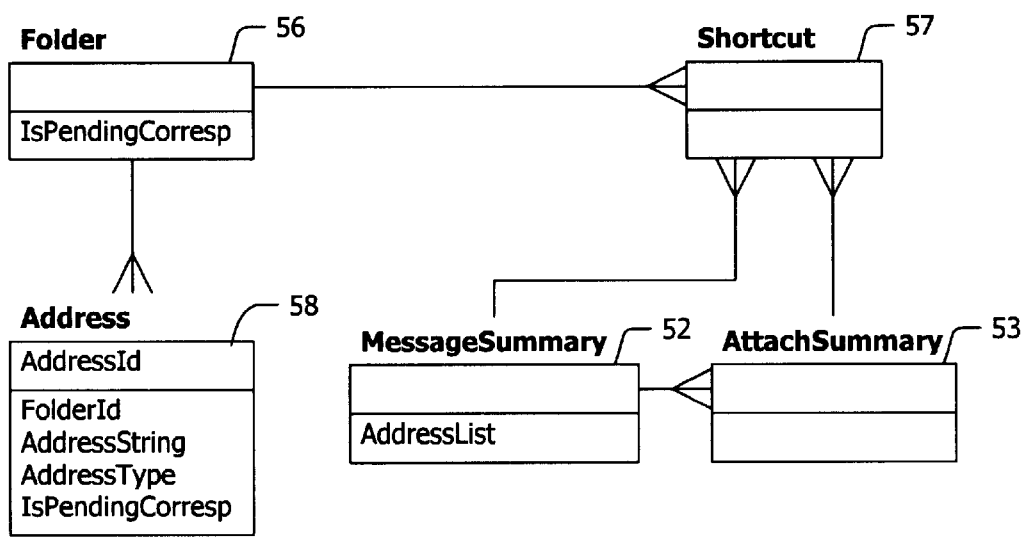
FIG. 18 is an entity-relationship diagram of the catalog database of FIGS. 8 and 16, showing additional elements that can be used to support a third layer of functionality.

Third layer 76 uses of the services of second layer 74, as well as the Direction, SendState and IsDeleted MessageSummary fields described above. To support third layer 76, catalog database 28 has some additional fields and tables as shown in FIG. 18. An address table 58 contains address information. This table associates an address with a correspondent or a bulk mail folder. A folder may be associated with zero or more addresses. Address table 58 is preferably sparsely populated, and contains entries only for meaningful addresses. It is not necessary to maintain full referential integrity between address table 58 and MessageSummary table 57. While the invention could be practised with a fully populated address table 58 in which referential integrity is maintained with MessageSummary table 57 by means of a Address-MessageSummary Relationship table it is believed that this would provide significantly degraded performance.

The keys defined for address table 58 in a preferred embodiment of the invention are as follows:

The PrimaryKey is AddressId. This key uniquely identifies a row in Address table 58.

AlternateKey1 is Uppercase(AddressString). This key is used to read address table 58 by the AddressString field. Duplicates are not allowed.

AlternateKey2 is FolderId. This key is used as a foreign key to associate an Address with a Folder. Duplicates are allowed.

The fields of Address table 58 are:

| | |
|---|---|
| AddressId | A non-zero value that uniquely identifies a row within the Address table. |
| FolderId | A non-zero value that uniquely identifies a row within the Folder table. |
| AddressString | The address used by the underlying message transport protocol (e.g., an SMTP address or an X.400 address) |
| AddressType | Identifies the type of address. Values are (atNoAddress - which indicates that there is no matching address in catalog database 28, atMyAddress - which indicates an address of the user of the messaging system, atCorrespAddress - which indicates an address of a recognized correspondent, atBulkAddress - which indicates an address of a recognized source of bulk mail). |
| IsPendingCorresp | Indicates whether the related folder has been identified as a pending correspondent folder. |

The following additional field may be added to Folder table 56 in catalog database 28 to implement the functions of third layer 76:

| | |
|---|---|
| IsPendingCorresp | Indicates whether the Folder has been identified as a pending Correspondent Folder |

The following additional fields may be added to MessageSummary table 52 to implement the functions of third layer 76:

AddressList (Array of [AddressRole+AddressString+AddressName])—encoded so that each element can be extracted separately.
The components of the AddressList are:

| | |
|---|---|
| AddressRole | Identifies the role of the Address. Values are (arFrom, arSender, arTo, arCc, arBcc). For example, an address in the RFC 822 "From:" header would be assigned an AddressRole of arFrom. Similarly addresses in the "Sender:", "To:", "Cc:" and "Bcc:" headers would be assigned AddressRoles of arSender, arTo, arCc, and arBcc respectively. Similar mappings can be made for other messaging protocols. |
| AddressString | The address used by the underlying message transport protocol (e.g., an SMTP address or an X.400 address). |
| AddressName | The display name associated with an address, if available. |

When a catalog database 28 according to the preferred embodiment of the invention is initialized, it contains system folders for "Correspondents", "Me", "Bulk Mail" and "Unsorted" messages as shown in FIG. 19. Details of these folders are provided in Folder table 56. Third layer 76 functions use knowledge of addresses that are associated with the messaging system user to classify messages according to their relationship to the messaging system user. A messaging system user may have multiple addresses. These addresses may be obtained by examining the messaging system's configuration information. In the alternative message client 27 may provide an interface which requests that the user enter his/her address(es) through the user interface. Each of these addresses is added as a row in Address table 58 using an AddMyAddress request.

Figure 20:
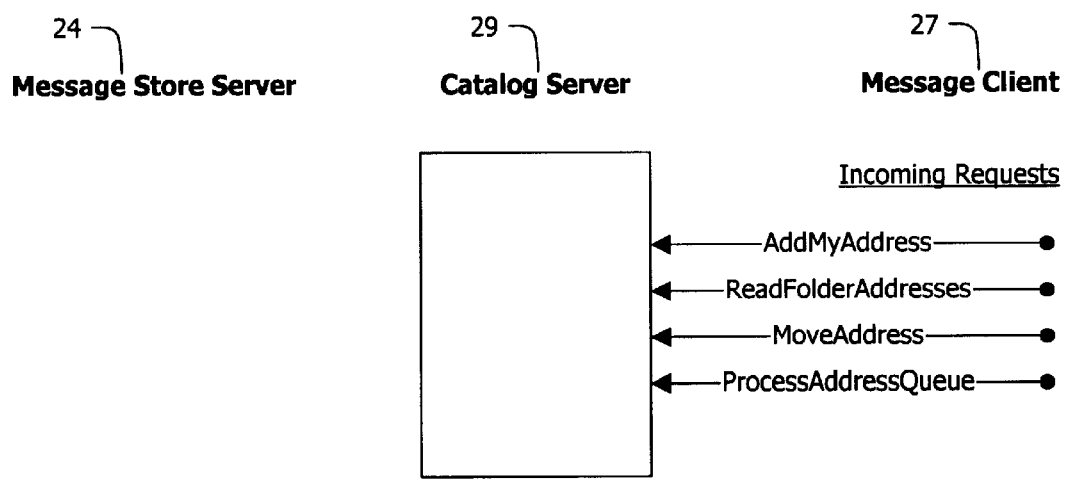
FIG. 20 is a diagram of catalog server requests and events, showing incoming requests which can be provided to support third layer functions.

FIG. 20 shows incoming requests that may be processed by catalog server 29 for implementing the functions of third layer 76. The processing for these incoming requests is shown in Table V. If any request cannot be processed as described, the ResultCode is set to indicate the error that occurred.

TABLE V

THIRD LAYER REQUESTS

Figure 26:
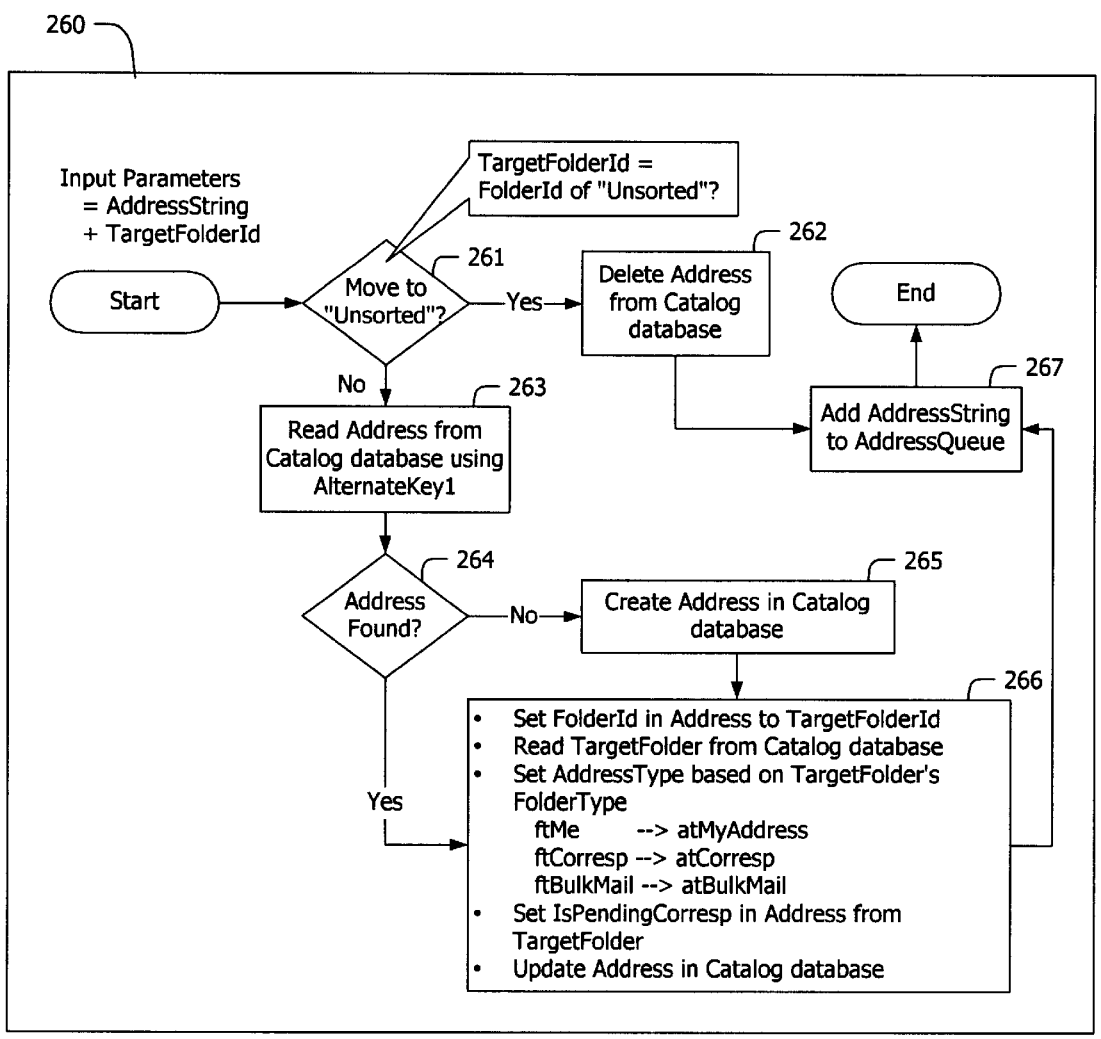
FIG. 26 is a flowchart that shows MoveAddress request processing.
Figure 27:
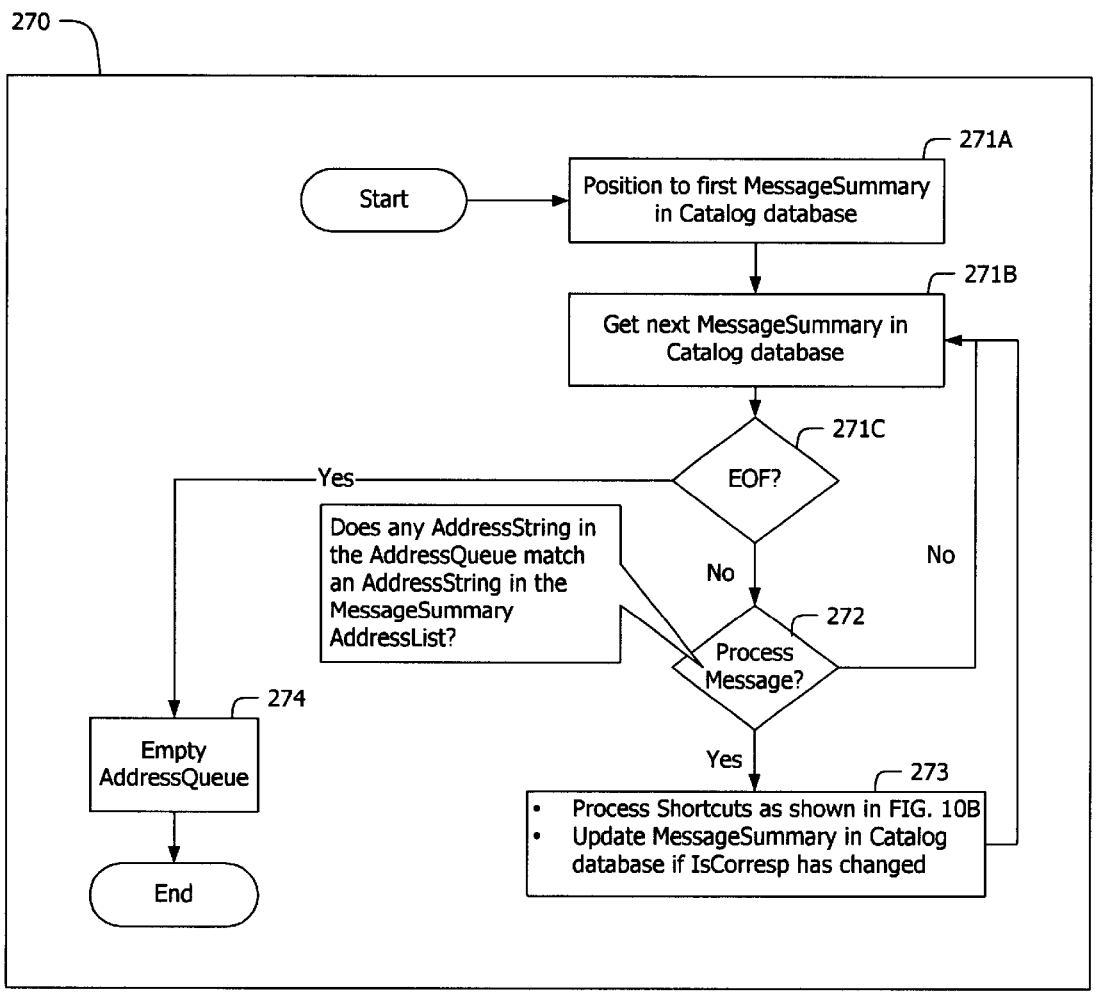
FIG. 27 is a flowchart that shows ProcessAddressQueue request processing.

| Incoming Request | Processing | Reply |
|---|---|---|
| AddMyAddress = AddressString | Build a new Address using:<br>- FolderId of the "Me" system folder<br>- AddressString from request<br>- AddressType of atMyAddress<br>Add the address to catalog database 28;<br>Build reply. | = ResultCode |
| ReadFolderAddresses = FolderId | Read all Addresses for the Folder using AlternateKey2<br>Build Reply | = ResultCode + AddressCount + Array of Address |
| MoveAddress = AddressString + TargetFolderId | Process as shown in FIG. 26<br>Build Reply | = ResultCode |
| ProcessAddressQueue | Process as shown in FIG. 27<br>Build Reply | = ResultCode |

Figure 21A:
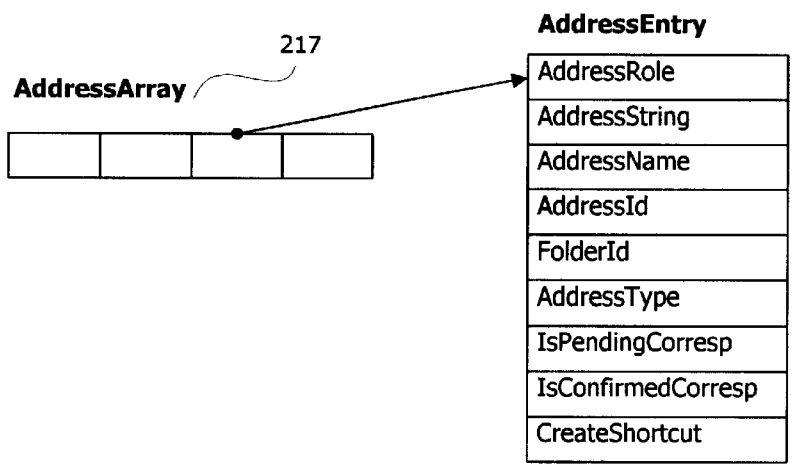
FIGS. 21A, 21B and 21C show memory structures which can be used for correspondent and bulk mail organization.
Figure 21B:
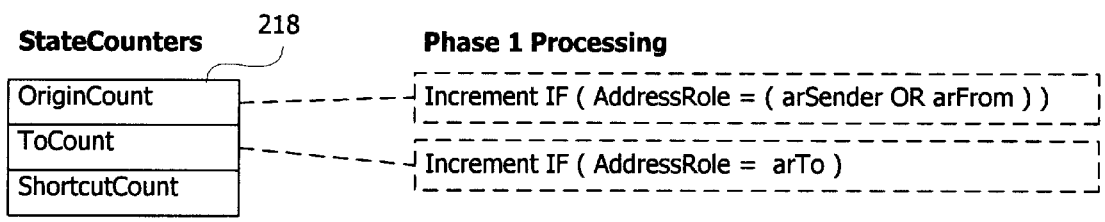
Figure 21C:
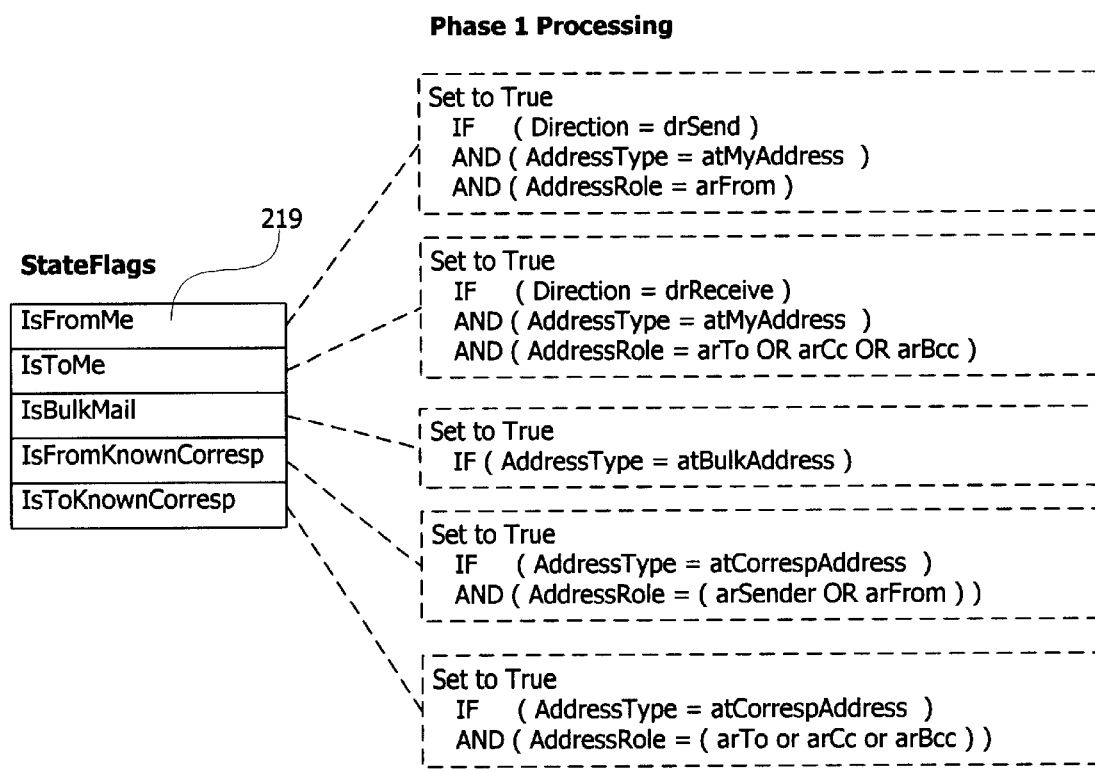

Third layer 76 applies a set of rules to automatically create shortcuts to messages and to associate those shortcuts with correspondents. This set of rules is preferably executed by catalog server 29 when processing shortcuts for a message as shown in step 105 of FIG. 10B. Catalog server 29 can use the "AddChangeShortcut" method (FIG. 10C) to create new shortcuts. It is advantageous to apply the rules of third layer 76 in two phases. In a first phase information about the addresses in a message is gathered and placed in memory structures. Suitable memory structures are illustrated in FIGS. 21A, 21B and 21C. The memory structures include an AddressArray 217 (FIG. 21A), StateCounters 218(FIG.

Figure 22:
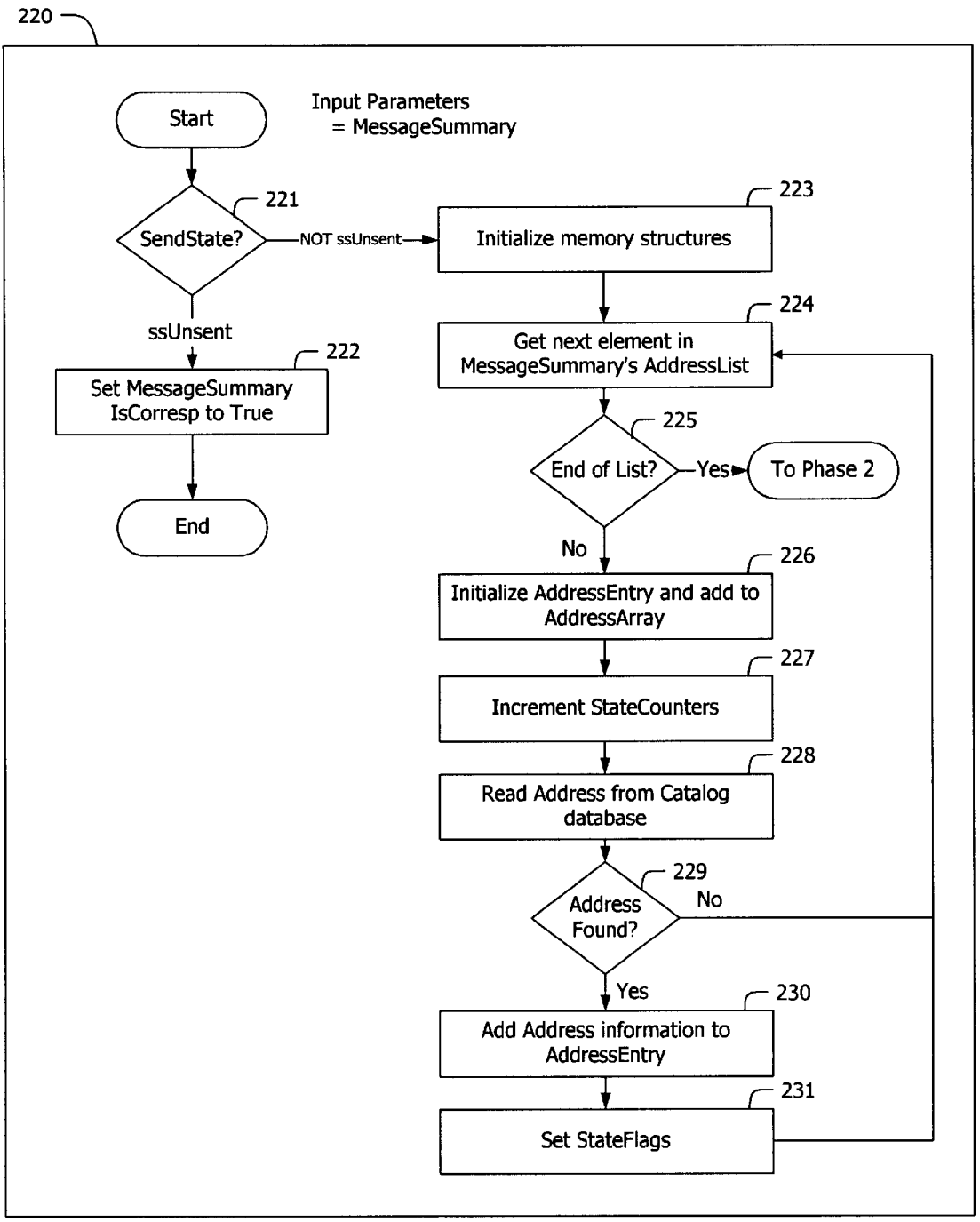
FIG. 22 is a flowchart that shows the first phase of correspondent and bulk mail organization.

21B) and StateFlags 219 (FIG. 21C). FIG. 22 shows a possible method 220 for building the memory structures.

The way in which third layer 76 generates shortcuts to a message in bulk mail or correspondence folders depends upon the status of the message. If a message is logically deleted, then second layer 74 (step 103 of FIG. 10B) creates a shortcut in the "Deleted" folder and no other shortcuts. Third layer 76 performs no processing for logically deleted messages. If a message is unsent (as detected at step 221) then third layer 76 creates no shortcuts, and classifies the message as correspondence (as opposed to bulk mail) by setting IsCorresp to True (step 222).

For all other messages, AddressArray 217 is initialized to an empty state, StateCounters 218 are set to zero, and StateFlags 219 are set to False (step 223). Then, each element in the MessageSummary's AddressList is retrieved (step 224), and an AddressEntry is created and added to AddressArray 217 as shown in FIG. 22. AddressEntry 217 is processed as follows:

AddressRole, AddressString and AddressName are set from values in the AddressList element (step 226);

AddressId and FolderId are set to zero and AddressType is set to atNoAddress (step 226);

IsPendingCorresp, IsConfirmedCorresp and CreateShortcut are set to False (step 226);

StateCounters 218 are incremented as shown in FIG. 21B (step 227);

The address is read from catalog database 28 (step 228) using AlternateKey1. If the Address is found (step 229), then AddressId, FolderId, AddressType and IsPendingCorresp are set from values in the Address (step 230); and, StateFlags 219 are set as shown in FIG. 21C (step 231).

Figure 23:
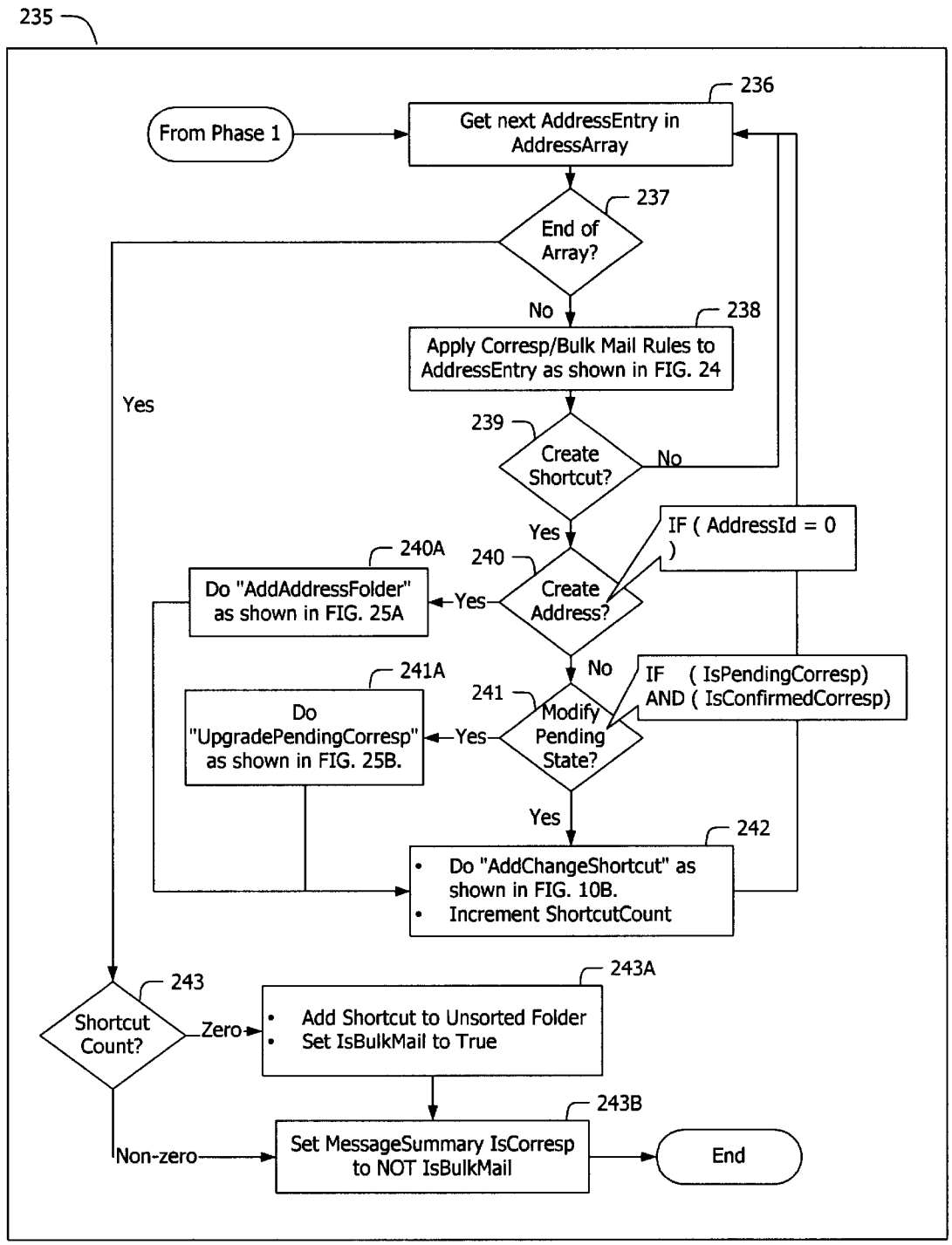
FIG. 23 is a flowchart that shows the second phase of correspondent and bulk mail organization.
Figure 24A:
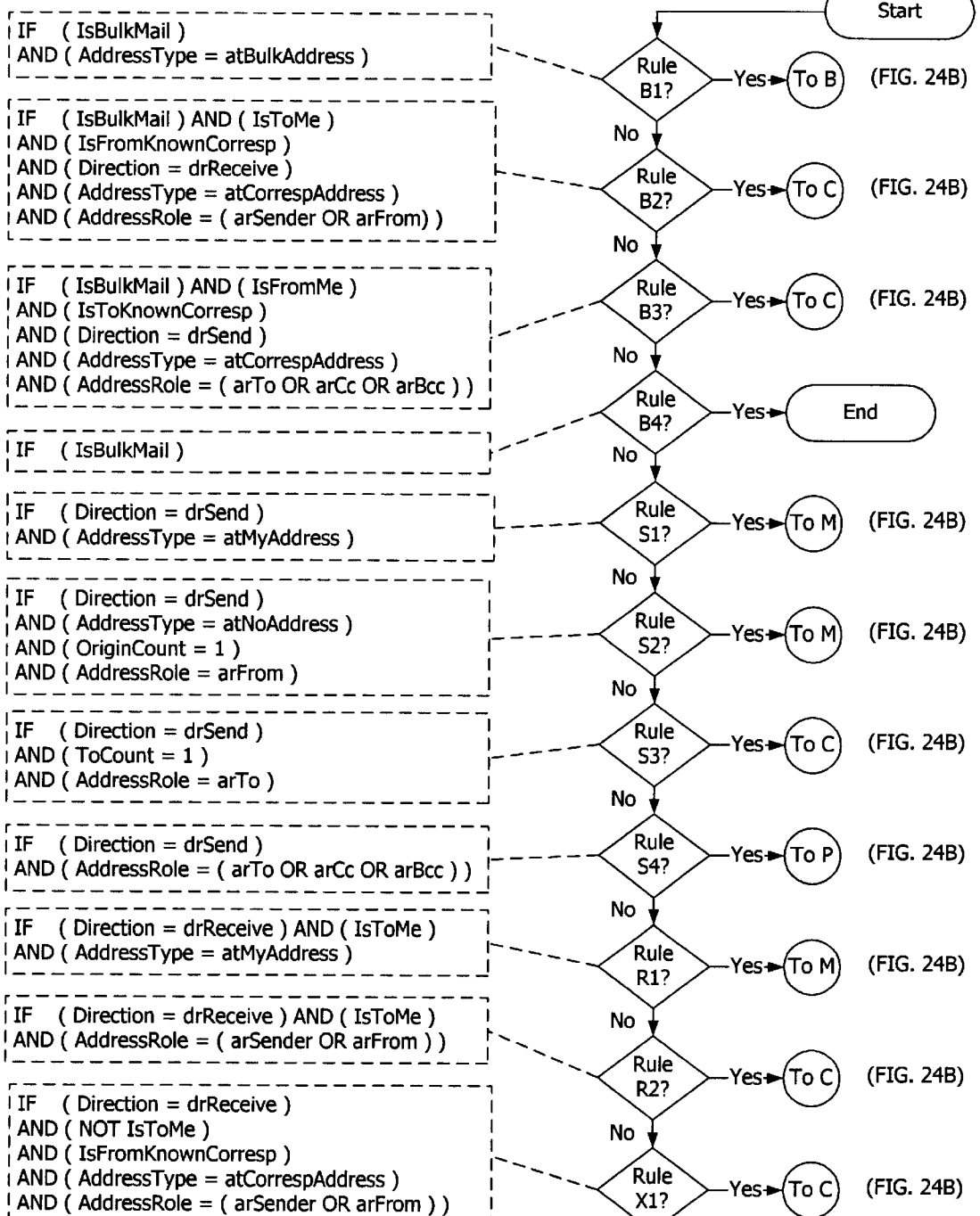
FIGS. 24A and 24B together provide a flowchart that shows rules that are applied to each AddressEntry by the second phase of correspondent and bulk mail organization.
Figure 24B:
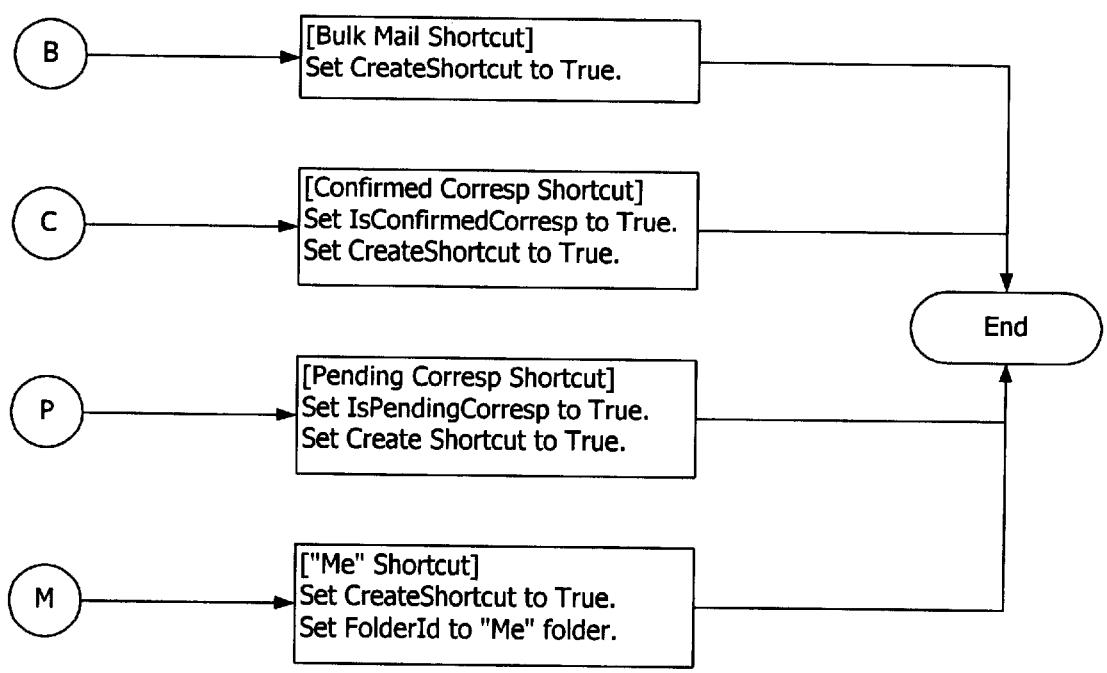
Figure 25A:
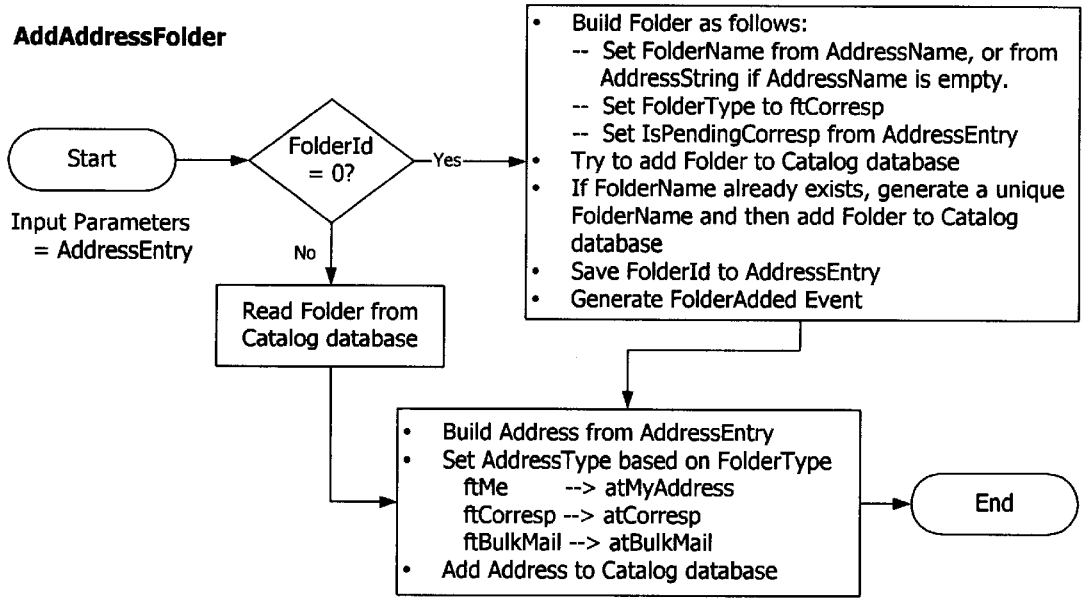
FIGS. 25A and 25B are flowcharts that show how addresses and folders can be added or updated during the second phase of correspondent and bulk mail organization.

When all of the elements in the AddressList of the MessageSummary for a message have been retrieved, as determined by step 225, then AddressArray 217 created by method 220 is processed. This may be done by a method 235 as shown in FIG. 23. For each entry in AddressArray 217, the following processing is performed:

Each entry in AddressArray 217 is retrieved (step 236);

The correspondent and bulk mail rules shown in FIGS. 24A and 24B are applied (step 238);

If, after applying the rules, the CreateShortcut flag is True, as determined at step 239, then:

If AddressId is zero, as determined at step 240, the required address and folder are added to catalog database 28 as shown in FIG. 25A "AddAddressFolder" (step 240A).

Figure 25B:
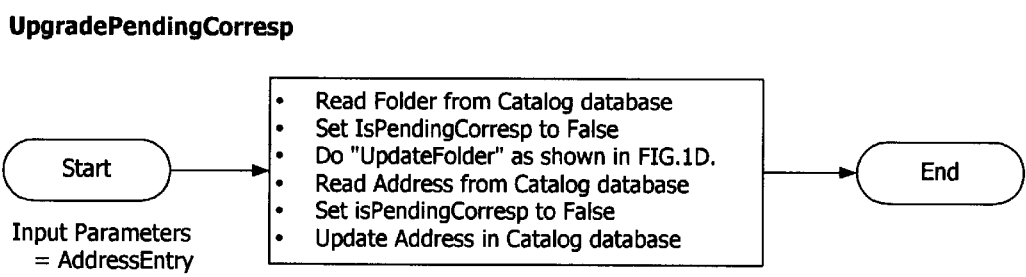

Otherwise, if IsPendingCorresp is True and IsConfirmedCorresp is True, as determined at step 241 then the correspondent is upgraded from a pending state, as shown in FIG. 25B "UpgradePendingCorresp" (step 241A).

The requested Shortcut is generated by using the AddChangeShortcut method of FIG. 10B (step 242).

ShortcutCount (FIG. 21B) is incremented (step 242).

When all entries in AddressArray 217 have been processed as determined at step 237, ShortcutCount is examined to determine if any Shortcuts were generated (step 243). If no Shortcuts were generated, then a shortcut to the message is added to the "Unsorted" Folder using the "AddChangeShortcut" method of FIG. 10B, and IsBulkMail is set to True (step 243A). Finally, the IsCorresp field in the MessageSummary is set to NOT(IsBulkMail) (step 243B).

The Correspondent and bulk mail rules applied in step 238 are shown in FIGS. 24A and 24B. These rules are applied to each AddressEntry in AddressArray 217. The functions of the rules can be briefly explained as follows:

| | |
|---|---|
| Rule B1 - | This rule creates a shortcut for an existing bulk mail address. |
| Rule B2 - | This rule creates a shortcut for an existing correspondent address if a received bulk mail message was also addressed directly to the user by the existing correspondent. |
| Rule B3 - | This rule creates a shortcut for an existing correspondent address if a sent bulk mail message was also addressed by the user directly to the existing correspondent. |
| Rule B4 - | This rule results in no additional shortcuts being created for a bulk mail message, (other than any shortcuts created by preceding rules) |
| Rule S1 - | This rule creates a Shortcut in the "Me" folder for a sent message if the message contains an address belonging to the "Me" folder. |
| Rule S2 - | Where a sent message does not contain an address belonging to the "Me" folder, and the message contains a "From" address but no "Sender" address, this rule adds the "From" address to the "Me" folder and creates a shortcut in the "Me" folder. This rule is not required for the successful operation of the invention, but is a convenience if the user changes his/her address. The rule assumes that if the "From" and "Sender" addresses are identical then only the "From" address is present in the message, as is the case with RFC 822 e-mail messages. For messaging systems that populate both the "From" and "Sender" addresses regardless of whether they are identical, it would be necessary to modify the implementation to handle this situation. The preferred solution would be to not add a "Sender" address to the AddressList if the "Sender" address is identical to the "From" address. |
| Rule S3 - | This rule creates a Shortcut for the "To" address in a sent message if the message has only a single "To" address and no "Cc" or "Bcc" addresses. If the address does not exist in catalog database 28 then the address and an associated folder are created as a confirmed correspondent (i.e. IsPendingCorresp is False) If the address and folder exist as a pending correspondent, they are upgraded to a confirmed correspondent. |
| Rule S4 - | This rule creates a shortcut for the "To", "Cc" or "Bcc" addresses in a sent message if a shortcut hasn't already been created for the address. If the address does not exist in catalog database 28 then the address and an associated folder are created as a pending correspondent (i.e. IsPendingCorresp is True) |
| Rule R1 - | This rule creates a shortcut in the "Me" folder for a received message if the message is addressed to me and contains an address belonging to the "Me" folder. |
| Rule R2 - | This rule creates a shortcut for the "From" and "Sender" addresses in a received message if the message is addressed to the user. If the address does not exist in catalog database 28 then the address and an associated folder are created as a confirmed correspondent (i.e. IsPendingCorresp is False). If the address and folder exist as a pending correspondent, they are upgraded to a confirmed correspondent. |
| Rule X1 - | This rule creates a shortcut for a existing correspondent where the message is sent by the existing correspondent but is not addressed to the user. The message could either be bulk mail or could be a blind carbon copy to the user - there is no way of determining this for messages where all "Bcc" information is completely suppressed. |

IsToMe, IsFromKnownCorresp, IsFromMe, IsToKnownCorresp, are StateFlags 219 as shown in FIG. 21C. These flags contain the results of Boolean expressions which respectively indicate: whether the message is addressed to the message system user; whether the message is from a recognized correspondent; whether the message is from the message system user; and whether the message is addressed to a recognized correspondent. The terms OriginCount and ToCount respectively are StateCounters 218 as shown in FIG. 21B. These StateCounters contain respectively: the number of senders of a message (a message can have multiple senders if it is sent by one messaging user on behalf of another user) and the number of direct recipients of a message (for e-mail messages this is the same as the number of To: addresses).

Third layer 76 preferably permits a user to manually change the Address/Folder relationships, and then to update catalog database 28 based on these changes. FIG. 26 shows a method 260 for associating an address with a folder. Method 260 is initiated by a MoveAddress request. The address identified in a MoveAddress request may either already exist in catalog database 28 or be a new address. Method 260 checks to determine if the address is being associated with the "Unsorted" folder (step 261). A feature of the sparsely populated Address table is that a message with a shortcut in the "Unsorted" folder has no other Correspondent or Bulk Mail shortcuts, and the "Unsorted" Folder has no addresses associated with it. Consequently, MoveAddress processing is preferably performed to delete an address from catalog database 28 (step 262) if a message is moved to the "Unsorted" Folder.

If the address is being moved so that it will be associated with a folder other than the Unsorted folder an attempt is made to read the address from catalog database 28 (step 263). If the address is not found, as determined at step 264, then a record for the address is created in catalog database 28 (step 265). The address record is then updated in catalog database 28 (step 266).

The MoveAddress request also adds the AddressString to an AddressQueue (step 267). The AddressQueue can be processed using the ProcessAddressQueue request as illustrated in FIG. 27. The AddressQueue can be a list of AddressStrings that is written to a text file or some other storage medium. Multiple AddressStrings may be added to the AddressQueue so that the processing of the AddressQueue can be deferred if desired.

After a user has associated addresses with particular folders the message system processes the message summaries in catalog database 28 to determine whether the changes to the addresses requires any shortcuts to be added or deleted. This may be done by the method 270 of FIG. 27. Method 270 reads all MessageSummaries in catalog database 28, and for each MessageSummary determines if the AddressList in the MessageSummary contains at least one of the AddressStrings in the AddressQueue (step 272). If so, shortcuts for the message are processed (step 273) as shown in FIG. 10B, which adds, updates, or deletes Shortcuts based on the current Address/Folder relationships. If the IsCorresp value in the MessageSummary changes as a result of this processing, then the MessageSummary is also updated in catalog database 28 (step 273).

In method 270 all message summaries are read by positioning at a first message summary (step 271A) and then reading message summaries sequentially (step 271B) until it is determined that all message summaries have been read (step 271C).

Even though the ProcessAddressQueue method reads all MessageSummaries in catalog database 28 its performance can be quite good where, as is strongly preferred, the MessageSummary records are quite small. Small MessageSummary records reduce the time required for physical I/O operations in reading MessageSummary table 52. Also, no shortcut processing is performed on message summaries that are not affected by the updated Address/Folder relationships (step 272 bypasses such message summaries).

The automatic organization that is performed by third layer 76 is useful and appropriate, but typically requires some additional manipulation by the user. This user manipulation can be performed through industry-standard user interface elements implemented by message client 27, and then communicated to catalog server 29 using the appropriate requests. An implementation of this invention may permit a user to perform any of many actions such as the following (it is assumed in the following discussion that ProcessAddressQueue Requests are deferred and then sent to catalog server 29 as desired by the user):

Moving an address from one folder to another can be done with a MoveAddress request to move the address to the target folder;

Combining two correspondent folders or two bulk mail folders into one can be done by:
  Using the ReadFolderAddresses request to obtain a list of addresses in the first folder; and,
  Moving each of the addresses from the first folder to the second folder using the MoveAddress request.

Deleting shortcuts from a source folder can be done using the DeleteFolderShortcuts request.

Deleting a folder can be done using the DeleteFolder request.

Changing a correspondent folder into a bulk mail folder can be done by:
  creating a new bulk mail folder with the CreateFolder request;
  using the ReadFolderAddresses request to obtain list of addresses in the correspondent folder;
  moving each address to the bulk mail folder using the MoveAddress request;
  deleting the shortcuts from the correspondent folder with the DeleteFolderShortcuts request; and,
  deleting the correspondent folder with the DeleteFolder request.

Changing a bulk mail folder into a correspondent folder can be done by:
  creating a new correspondent folder with the CreateFolder request;
  using the ReadFolderAddresses request to obtain a list of addresses in the bulk mail folder;
  moving each address to the correspondent folder with the MoveAddress request;
  deleting shortcuts from the bulk mail folder with the DeleteFolderShortcuts request; and,
  deleting the bulk mail folder with the DeleteFolder request.

Creating a new bulk mail folder can be done with the CreateFolder request.

Associating an address with a bulk mail folder can be done with the MoveAddress request.

Removing an address from a bulk mail folder (this would be done, for example, when the message system user no longer wants bulk mail organized based on the address) can be done by moving the address to the "Unsorted" folder with the MoveAddress request.

The methods of third layer 76 can automatically distinguish a possible (or pending) correspondent from a confirmed correspondent, and automatically upgrade a pending correspondent to a confirmed correspondent when appropriate.

Preferred implementations of the invention include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

It can be appreciated that the preferred embodiment of the invention described above permits messages to be organized in new ways including:

- automatic organization of messages into multiple folders based on message status, e.g. Active Mail, Deleted, Drafts, Received, Sent, Waiting Send and Unread;
- automatic organization of messages into multiple folders based on the message date, e.g. Today, Yesterday, This Week, Last Week, and Month;
- automatic organization of messages into multiple folders based on attachment type;
- automatic organization of messages into multiple folders based on user assigned values, e.g. Kept, Tagged, To Do, and Keywords;
- support for user overrides of automatic organization by letting the user include a message in or exclude a message from any folder;
- automatic organization of messages into multiple folders based on correspondent;
- automatic separation of bulk mail from correspondence;
- techniques to manage correspondent and bulk mail folders;
- support for multiple saved search results folders; and
- support for improved filtering mechanisms.

The invention may be applied to organizing e-mail messages. An e-mail client which embodies the invention may provide a unified view of multiple message stores through the use of shortcuts. One useful application is creating a catalog database 28 for both a mailbox containing recent e-mail messages and one or more archived message stores. Use of the preferred embodiment of the invention permits a user to identify potentially important messages among less important messages by separating bulk mail from correspondence and by letting users identify hot folders. Users can manage the flow of messages through use of the ActiveMail folder and the ToDo status folder.

As will be apparent to those skilled in the art in the light of the foregoing disclosure, many alterations and modifications are possible in the practice of this invention without departing from the spirit or scope thereof. For example, it will be understood from the foregoing that in systems or methods according to various embodiments of the invention:

- the preferred embodiment described above uses an event-driven architecture wherein software components inform other software components of certain of changes by generating events. This is currently considered to be a good way to implement this invention. An event-driven architecture is not fundamental to this invention however. Other software techniques could also be used to coordinate the operation of the various components of this invention.
- The description above has broken the software components used to practise the preferred embodiment of the invention into discrete logical components. In any particular implementation it would be possible to combine multiple logical components into a single component. For example, the functions of message store server 27 and catalog server 29 could be integrated into a single component. Software components which are described herein as being a single component could also be split into multiple sub-components without departing from this invention.
- While much of the functionality of the preferred embodiments described above has been expressed as being provided by the same software that operates as a server for catalog database 28 this is convenient but not necessary to the practice of the invention;
- While the term database has been used in this specification primarily to refer to relational databases this is not required in all cases.
- any number of mechanisms can be implemented in the user interface to let a user manipulate folders and messages, including pop-up menus, accelerator keys, dialog boxes, and drag-and-drop operations.
- While it is not preferred, the same filter engine could be used to apply both automatic organization rules and filtering rules.
- The invention may be applied to many different message types.
- The invention may be used in conjunction with many different user interfaces on many different display devices.
- The names of methods, requests, and events can be changed.

Accordingly, the scope of the invention is to be construed in accordance with the substance defined by the following claims.

What is claimed is:

1. A method for organizing electronic messages comprising:

providing an electronic message, the electronic message comprising a plurality of properties;

generating a plurality of shortcuts to the electronic message, each of the shortcuts comprising a record in a database, each record comprising a FolderId value associating the shortcut with a different one of a plurality of folders and a MessageId value associating the shortcut with the message wherein each of the records comprises a SortKey value, and the method comprises:

identifying a sort field for at least one of the folders; and, for each of a plurality of shortcuts associated with the at least one of the folders setting the SortKey value based upon a value corresponding to the shortcut in the sort field wherein setting the SortKey value for each of the shortcuts comprises retrieving a most significant portion of a value for the sort field corresponding to the shortcut and basing the SortKey value on the most significant portion of the value for the sort field.

2. The method of claim 1 wherein each of the shortcuts has a size of 64 Bytes or less.

3. The method of claim 1 wherein each of the shortcuts has a size of 32 Bytes or less.

4. The method of claim 1 wherein each of the shortcuts has a size of 24 Bytes or less.

5. The method of claim 1 wherein the message has an attachment and the shortcut additionally comprises an AttachId value identifying the attachment.

6. The method of claim 5 wherein the attachment is stored in a data store and the AttachId value identifies the attachment in the data store.

7. The method of claim 5 wherein the attachment is stored in a data store and the AttachId identifies an Attachment-Summary record in the database, wherein the Attachment-Summary record contains information identifying the attachment in the data store.

8. The method of claim 5 comprising identifying a type of the attachment and automatically creating a shortcut to the message in a folder corresponding to the type of attachment.

9. The method of claim 8 comprising automatically creating the folder corresponding to the type of attachment.

10. The method of claim 1 wherein one or more of the folders is designated as belonging to a first set of folders and the method comprises displaying on a display a representation of folders available for selection by a user and, in response to a user input, suppressing the display in the representation of folders not belonging to the first set.

11. The method of claim 1 comprising generating a plurality of shortcuts in the database for each of a plurality of messages, wherein a first group of the messages is stored in a first data store and a second group of the messages is stored in a second data store distinct from the first data store.

12. The method of claim 1 comprising, for a plurality of messages, identifying one or more e-mail addresses associated with the message and creating a shortcut to the message in a folder associated with each of the e-mail addresses.

13. The method of claim 12 comprising applying the rules of FIG. 24A to each of the e-mail addresses.

14. The method of claim 1 comprising creating the shortcuts at least in folders associated with each of: a time associated with the message; a sender of the message; and a type of attachment associated with the message.

15. A method according to claim 1 comprising identifying a sort direction for the at least one of the folders wherein setting the SortKey value is also based upon the sort direction.

16. A method according to claim 1 comprising setting the SortKey value to the same value for at least two of the plurality of shortcuts associated with the at least one of the folders.

17. A method according to claim 1 comprising sorting the plurality of shortcuts associated with the at least one of the folders by SortKey value.

18. A method according to claim 1 comprising determining a format of the sort field and selecting a corresponding format for the SortKey value wherein setting the SortKey value comprises writing the SortKey value in the corresponding format.

19. A method according to claim 1 wherein setting the SortKey value comprises writing the most significant portion of the value for the sort field as the SortKey value.

20. A method according to claim 1 wherein the most significant portion of the value for the sort field excludes at least some of the value for the sort field.

21. A method according to claim 1 wherein the shortcuts comprise records in a shortcut table and the shortcut table has a key of FolderId+SortKey.

22. A method according to claim 1 wherein retrieving the most significant part of the value for the sort field comprises retrieving the value for the sort field and identifying a most significant part of the retrieved value.

23. A method according to claim 1 comprising:

identifying a set of shortcuts having a FolderId value, identifying one or more consecutive SortKey values of shortcuts in the set of shortcuts and identifying as a subset of the set of shortcuts, all shortcuts in the set of shortcuts having any one of the one or more consecutive SortKey values, sorting the shortcuts in the subset according to values in the sort field corresponding to each of the shortcuts, and displaying at least some of the shortcuts of the subset in sorted order.

24. A method according to claim 23 wherein identifying a subset of the set of shortcuts comprises including in the subset:

a predetermined number of the shortcuts taken in order of the SortKey values of the shortcuts; and all shortcuts having a SortKey value equal to the SortKey value of a last one of the shortcuts in the predetermined number of the shortcuts.

25. A computer readable medium containing instructions which, when executed on a computer system, cause the computer system to implement the method of claim 1.

26. A method according to claim 1 wherein the method comprises:

identifying a new sort field for at least one of the folders; and, for each shortcut associated with the at least one of the folders setting the SortKey value based upon a value corresponding to the shortcut in the new sort field.

27. A method according to claim 26 comprising identifying a sort direction for the at least one of the folders wherein setting the SortKey value is also based upon the sort direction.

28. A method according to claim 26 comprising determining a format of the new sort field and selecting a corresponding format for the SortKey value wherein setting the SortKey value comprises writing the SortKey value in the corresponding format.

29. A method for locating a stored electronic message, the method comprising:

selecting a folder, the folder associated with a plurality of shortcuts, each shortcut associated with a message and comprising a SortKey value the SortKey value based upon a value of a sort field corresponding to the message associated with the shortcut;

requesting a first set of the shortcuts in the folder, the shortcuts of the first set having one or more consecutive SortKey values;

receiving the first set of shortcuts;

sorting the first set of shortcuts according to values of the sort field; and, displaying a sorted representation of shortcuts in the first set of shortcuts to a user wherein the method comprises:

identifying a new sort field for at least one of the folders; and, for each shortcut associated with the at least one of the folders setting the SortKey value based upon a value corresponding to the shortcut in the new sort field wherein setting the SortKey value comprises retrieving a most significant portion of a value for the new sort field corresponding to the shortcut and basing the SortKey value on the most significant portion of the value for the new sort field.

30. A computer readable medium containing instructions which, when executed on a computer system, cause the computer system to implement the method of claim 29.

31. A method according to claim 29 wherein setting the SortKey value comprises writing the most significant portion of the value for the new sort field as the SortKey value.

32. A method according to claim 29 wherein the most significant portion of the value for the new sort field excludes at least some of the value for the new sort field.

33. A method according to claim 29 comprising:

identifying a set of shortcuts associated with a folder, identifying one or more consecutive SortKey values of shortcuts in the set of shortcuts and identifying as a subset of the set of shortcuts, all shortcuts in the set of shortcuts having any one of the one or more consecutive SortKey values, sorting the shortcuts in the subset according to values in the new sort field corresponding to each of the shortcuts, and displaying at least some of the shortcuts of the subset in sorted order.

34. A method according to claim 33 wherein identifying a subset of the set of shortcuts comprises including in the subset:

a predetermined number of the shortcuts taken in order of the SortKey values of the shortcuts; and all shortcuts having a SortKey value equal to the SortKey value of a last one of the shortcuts in the predetermined number of the shortcuts.

* * * * *